(12) United States Patent
Iizuka et al.

(10) Patent No.: US 7,964,118 B2
(45) Date of Patent: Jun. 21, 2011

(54) POSITIVE ELECTRODE ACTIVE MATERIAL AND METHOD OF PRODUCING THE SAME AND NONAQUEOUS ELECTROLYTE BATTERY HAVING POSITIVE ELECTRODE CONTAINING POSITIVE ELECTRODE ACTIVE MATERIAL

(75) Inventors: Shinji Iizuka, Shibukawa (JP); Osamu Omae, Shibukawa (JP); Kumiko Sueto, Shibikawa (JP); Takeshi Shimada, Shibukawa (JP); Shigeto Okada, Fukuoka (JP); Tomoko Iwanaga, Fukuoka (JP); Tomoyuki Shiratsuchi, Ohnojo (JP); Jun-ichi Yamaki, Kasuga (JP)

(73) Assignees: Kanto Denka Kogyo Co., Ltd., Tokyo (JP); Kyushu University, National University Corp., Fukuoka (JP)

( * ) Notice: Subject to any disclaimer, the term of this patent is extended or adjusted under 35 U.S.C. 154(b) by 553 days.

(21) Appl. No.: 12/067,782

(22) PCT Filed: Sep. 20, 2006

(86) PCT No.: PCT/JP2006/318607
§ 371 (c)(1),
(2), (4) Date: Mar. 21, 2008

(87) PCT Pub. No.: WO2007/034821
PCT Pub. Date: Mar. 29, 2007

(65) Prior Publication Data
US 2010/0148114 A1  Jun. 17, 2010

(30) Foreign Application Priority Data

Sep. 21, 2005  (JP) ................. 2005-274120

(51) Int. Cl.
*H01B 1/08* (2006.01)
*C01B 25/45* (2006.01)
*H01M 4/02* (2006.01)
(52) U.S. Cl. .............. 252/520.21; 252/521.2; 429/224
(58) Field of Classification Search ............ 252/520.21, 252/521.2, 519.15; 429/224
See application file for complete search history.

(56) References Cited

U.S. PATENT DOCUMENTS 6,749,967 B2  6/2004  Li et al.
(Continued)

FOREIGN PATENT DOCUMENTS

CN  1322023 A  11/2001
(Continued)

OTHER PUBLICATIONS

Arcon et al. "Weak ferromagnetism of LiMnPO4", Journal of Physics and Chemistry of Solids 65 (2004) pp. 1773-1777.
(Continued)

*Primary Examiner* — Mark Kopec
(74) *Attorney, Agent, or Firm* — Browdy and Neimark, PLLC

(57) ABSTRACT

The present invention provides an olivine-type positive electrode active material that is an inexpensive and very safe positive electrode active material that also exhibits excellent battery properties even at high energy densities. The present invention also provides a method of producing this olivine-type positive electrode active material and a nonaqueous electrolyte battery that has a positive electrode that contains this olivine-type positive electrode active material. The present invention relates to a positive electrode active material that comprises an olivine-type lithium manganese phosphate compound represented by the following general formula (1)

$$Li_xMn_yM_aPO_4 \quad (1)$$

(in the formula, $0<x<2$, $0<y<1$, $0<a<1$, and M is at least one metal element selected from the group consisting of Co, Ni, Fe, Zn, Cu, Ti, Sn, Zr, V, and Al) and that has a particle diameter of 10 to 500 nm.

8 Claims, 22 Drawing Sheets

U.S. PATENT DOCUMENTS

| | | | |
|---|---|---|---|
| 6,797,431 B2 | 9/2004 | Hosoya et al. | |
| 6,855,273 B2 | 2/2005 | Ravet et al. | |
| 6,962,666 B2 | 11/2005 | Ravet et al. | |
| 7,025,907 B2 | 4/2006 | Kohzaki et al. | |
| 7,338,734 B2 * | 3/2008 | Chiang et al. | 429/221 |
| 7,390,472 B1 * | 6/2008 | Singhal et al. | 423/306 |
| 2003/0064290 A1 * | 4/2003 | Li | 429/231.95 |
| 2006/0060827 A1 | 3/2006 | Ravet et al. | |
| 2007/0031732 A1 * | 2/2007 | Chiang et al. | 429/231.95 |
| 2010/0075225 A1 * | 3/2010 | Wilkins et al. | 429/212 |
| 2010/0178562 A1 * | 7/2010 | Exnar et al. | 429/221 |

FOREIGN PATENT DOCUMENTS

| | | |
|---|---|---|
| JP | 2001-15111 A | 1/2001 |
| JP | 2001-307731 A | 11/2001 |
| JP | 2002-110163 A | 4/2002 |
| JP | 2003-34534 A | 2/2003 |
| JP | 2003-203628 A | 7/2003 |
| JP | 2003-229127 A | 8/2003 |
| JP | 2003-257429 A | 9/2003 |
| JP | 2004-063270 A | 2/2004 |
| JP | 2004-259471 A | 9/2004 |
| JP | 2005-047751 A | 2/2005 |
| JP | 2005-050684 A | 2/2005 |

OTHER PUBLICATIONS

Yamada et al. "Olivine-type cathodes Achievements and problems", Journal of Power Sources 119-121 (2003) pp. 232-238.

Li et al, "LiMnPO4 as the Cathode for Lithium Batteries", Electrochemical and Solid-State Letters, 5 (6) pp. A135-A137 (2002).

Huang et al. "Approaching Theoretical Capacity of LifePO4 at Room Temperature at High Rates", Electrochemical and Solid-State Letters, 4 (10) pp. A170-A172 (2001).

Chen et al, "Reducing Carbon in LifePO4/C Composite Electrodes to Maximize Specific Energy, Volumetric Energy, and Tap Density", Journal of the Electrochemical Society, 149 (9) pp. A1184-A1189 (2002).

* cited by examiner

POSITIVE ELECTRODE ACTIVE MATERIAL AND METHOD OF PRODUCING THE SAME AND NONAQUEOUS ELECTROLYTE BATTERY HAVING POSITIVE ELECTRODE CONTAINING POSITIVE ELECTRODE ACTIVE MATERIAL

TECHNICAL FIELD

The present invention relates to an olivine-type positive electrode active material that is an inexpensive and very safe positive electrode active material that also exhibits excellent battery properties even at high energy densities. The present invention also relates to a method of producing this olivine-type positive electrode active material and to a nonaqueous electrolyte battery that has a positive electrode that contains this olivine-type positive electrode active material.

BACKGROUND ART

Lithium secondary batteries are currently in widespread use as power sources for electronic devices such as portable telephones, video cameras, notebook computers, and so forth. In addition, with environmental protection and energy issues as a driving force, the development is also being pursued of inexpensive and very safe large lithium secondary batteries for electric automobiles and nighttime electrical power.

Layered rock salt-type $LiCoO_2$ has primarily been employed for the positive electrode active material of lithium secondary batteries. $LiCoO_2$ has excellent charge-discharge cycling characteristics, but is expensive due to the scarce reserves of its cobalt ingredient. This has led to investigations of layered rock salt-type $LiNiO_2$ and spinel-type $LiMn_2O_4$ as replacement positive electrode active materials. However, $LiNiO_2$ has a problem with the safety of its charged state, while $LiMn_2O_4$ has a problem with chemical stability in high temperature regions. Novel positive electrode materials that combine these elements been proposed for small batteries, but there has been demand for novel replacement materials for the positive electrode active material for large batteries, where the cost and safety requirements are more stringent.

$LiFePO_4$ and $LiMnPO_4$, which are olivine-type positive electrode active materials, have been under active development in recent years as materials that are well-rated with regard to cost, safety, and reliability. Many research reports on $LiFePO_4$ have appeared in a short period of time because it has a better electroconductivity than that of $LiMnPO_4$. $LiMnPO_4$, on the other hand, has a higher energy density due to the higher redox potential of Mn and is looked upon as a positive electrode active material that has the potential to have better properties than $LiFePO_4$; this notwithstanding, however, it has been reported to be a material that has a low electronic conductivity and is therefore problematic with regard to obtaining a satisfactory battery capacity. Efforts to improve the battery capacity by replacing some of the Mn with another element have also been proposed, as described in Patent documents 1 to 3 and Non-Patent documents 1 to 3. However, when the present inventors produced positive electrode active materials in which a portion of the Mn was replaced by a single selection from Co, Ni, Ti, and so forth as proposed in these patent references, and then fabricated batteries using these positive electrode active materials, the present inventors were unable to confirm an improvement in the capacity of these batteries. The present inventors were also unable to confirm a plateau at around 4 V in constant-current charge-discharge testing of these batteries.

There are also numerous publications relating to the addition of carbon to positive electrode active materials, and in particular it is already known that the addition of carbon has a number of effects in olivine-type lithium iron phosphate positive electrode active materials, such as improving the electroconductivity, inhibiting sintering between particles, inhibiting oxidation, and so forth (refer, for example, to Patent documents 4 to 6 and to Non-Patent documents 4 and 5). A problem here, however, is that the specific surface area of the positive electrode active material is increased by the addition of high specific surface area carbon particles and by the coating of the positive electrode active material by such carbon particles. This increase in the specific surface area causes a reduction in the dispersibility of the positive electrode active material in paint and thereby makes it difficult to uniformly coat the positive electrode active material at high densities on an electrode.

As shown in Patent document 7, a method directed to paint dispersibility has been proposed for the addition of carbon to positive electrode active materials. In this method, the particles of the positive electrode active material are coated with a thermosetting resin and the coated particles are then heat treated in an oxidizing atmosphere. However, a solvent is required to achieve uniform mixing and coating of the resin, and solvent handling is quite burdensome. In addition, an essential aspect of this method is heat treatment under an oxidizing atmosphere, which impairs the application of this method to olivine-type positive electrode active materials that contain a metal element that is easily oxidized from the divalent to trivalent state.

Patent document 1: Japanese Patent Laid-open Publication No. 2001-307731

Patent document 2: Japanese Patent Laid-open Publication No. 2003-257429

Patent document 3: Japanese Patent Laid-open Publication No. 2004-63270

Patent document 4: Japanese Patent Laid-open Publication No. 2001-15111

Patent document 5: Japanese Patent Laid-open Publication No. 2002-110163

Patent document 6: Japanese Patent Laid-open Publication No. 2003-34534

Patent document 7: Japanese Patent Laid-open Publication No. 2003-229127

Non-Patent document 1: by D. Arcon, A. Zorko, P. Cevc, R. Dominko, M. Bele, J. Jamnik, Z. Jaglicic, and I. Golosovsky, *Journal of Physics and Chemistry of Solids*, 65, 1773-1777 (2004)

Non-Patent document 2: A. Yamada, M. Hosoya, S. Chung, Y. Kudo, K. Hinokuma, K. Liu, and Y. Nishi, *Journal of Power Sources*, 119-121, 232-238 (2003)

Non-Patent document 3: Guohua Li, Hideto Azuma, and Masayuki Tohda, *Electrochemical and Solid-State Letters*, 5(6), A1135-A1137 (2002)

Non-Patent document 4: H. Huang, S. C. Yin, and L. F. Nazar, *Electrochemical and Solid-State Letters*, 4(10), A170-A172 (2001)

Non-Patent document 5: Z. Chen and J. R. Dahn, *Journal of the Electrochemical Society*, 149 (9), A1184-A1189 (2002)

DISCLOSURE OF THE INVENTION

Problem to be Solved by the Invention

An object of the present invention is to provide a positive electrode active material that has an excellent performance with regard to cost, safety, and reliability and that enables the production of a high capacity nonaqueous electrolyte battery. Another object of the present invention is to provide a method of producing this positive electrode active material. A further object of the present invention is to provide a nonaqueous electrolyte battery that uses this positive electrode active material.

Means for Solving the Problems

The present inventors achieved the present invention as a result of intensive investigations directed to the production of a positive electrode active material that would have the excellent properties described above.

That is, the present invention provides the following.

[1] A positive electrode active material that comprises an olivine-type lithium manganese phosphate compound represented by the following general formula (1)

$$Li_xMn_yM_aPO_4 \quad (1)$$

(in the formula, $0<x<2$, $0<y<1$, $0<a<1$, and M is at least one metal element selected from the group consisting of Co, Ni, Fe, Zn, Cu, Ti, Sn, Zr, V, and Al) and that has a particle diameter of 10 to 500 nm.

[2] The positive electrode active material according to [1], wherein the olivine-type lithium manganese phosphate compound is represented by the following general formula (2)

$$Li_xMn_yM^1_zM^2_wPO_4 \quad (2)$$

(in the formula, $0<x<2$, $0<y<1$, $0<z<1$, $0<w<1$, $M^1$ is at least one divalent metal element selected from the group consisting of Co, Ni, Fe, Zn, and Cu, and $M^2$ is at least one trivalent or tetravalent metal element selected from the group consisting of Ti, Sn, Zr, V, and Al).

[3] The positive electrode active material according to [2], wherein $M^1$ is at least one divalent metal element selected from the group consisting of Co, Ni, and Fe, and $M^2$ is Ti.

[4] The positive electrode active material according to [2] or [3], wherein z and w respectively satisfy $0<z<0.2$ and $0<w<0.2$.

[5] The positive electrode active material according to any of [1] to [4], wherein y satisfies $0.8<y<1.0$.

[6] The positive electrode active material according to any of [1] to [5], wherein the particle diameter is 50 to 200 nm.

[7] The positive electrode active material according to any of [1] to [6], that has a BET specific surface area of 1 to 200 $m^2/g$.

[8] The positive electrode active material according to any of [1] to [7], further comprising carbon on the surface of the olivine-type lithium manganese phosphate compound particles.

[9] The positive electrode active material according to [8], that contains carbon in an amount no greater than 20 weight %.

[10] A nonaqueous electrolyte battery, which has a positive electrode comprising the positive electrode active material according to any of [1] to [9].

[11] A method of producing a positive electrode active material, comprising the steps of:
mixing a pre-calcination precursor for an olivine-type lithium manganese phosphate compound represented by the following general formula (1)

$$Li_xMn_yM_aPO_4 \quad (1)$$

(in the formula, $0<x<2$, $0<y<1$, $0<a<1$, and M is at least one metal element selected from the group consisting of Co, Ni, Fe, Zn, Cu, Ti, Sn, Zr, V, and Al) with a carbon source; and
calcining the obtained mixture.

[12] The production method according to [11], wherein the pre-calcination precursor for the olivine-type lithium manganese phosphate compound is a coprecipitated product obtained by a step comprising: mixing an aqueous manganese salt solution, an aqueous solution containing the salt of at least one metal selected from the group consisting of Co, Ni, Fe, Zn, Cu, Ti, Sn, Zr, V, and Al, an aqueous $H_3PO_4$ solution, and an aqueous LiOH solution; and producing a coprecipitated product by holding the obtained mixed solution at 50 to 100° C.

[13] The production method according to [11] or [12], wherein the olivine-type lithium manganese phosphate compound is represented by the following general formula (2)

$$Li_xMn_yM^1_zM^2_wPO_4 \quad (2)$$

(in the formula, $0<x<2$, $0<y<1$, $0<z<1$, $0<w<1$, $M^2$ is at least one divalent metal element selected from the group consisting of Co, Ni, Fe, Zn, and Cu, and $M^2$ is at least one trivalent or tetravalent metal element selected from the group consisting of Ti, Sn, Zr, V, and Al).

[14] The production method according to any of [11] to [13], wherein the carbon source comprises carbon particles or a carbon precursor, or carbon particles and a carbon precursor.

[15] The production method according to [14], wherein the carbon precursor is at least one selected from the group consisting of polyvinyl alcohol, starch, and granulated sugar.

[16] The production method according to any of [11] to [15], wherein calcination is carried out under an inert gas atmosphere or a reducing atmosphere.

[17] The production method according to any of [11] to [13], wherein the carbon source is at least one selected from the group consisting of glucose, cellulose acetate, pyromellitic acid, acetone, and ethanol.

BEST MODE FOR CARRYING OUT THE INVENTION

[The Positive Electrode Active Material]

Figure 1:
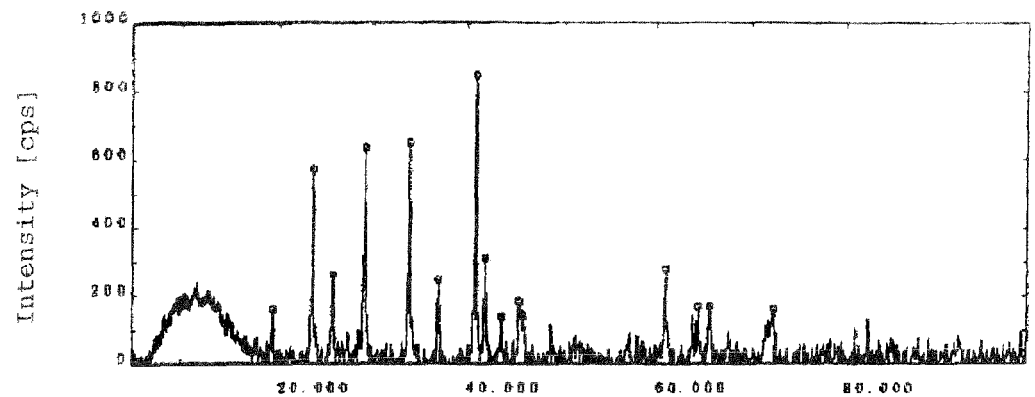
FIG. 1 is an x-ray diffractogram of the positive electrode active material produced in Example 1.

The positive electrode active material of the present invention comprises an olivine-type lithium manganese phosphate compound represented by the following general formula (1)

$$Li_xMn_yM_aPO_4 \qquad (1)$$

(in the formula, $0<x<2$, $0<y<1$, $0<a<1$, and M is at least one metal element selected from the group consisting of Co, Ni, Fe, Zn, Cu, Ti, Sn, Zr, V, and Al) and has a particle diameter of 10 to 500 nm.

A first characteristic feature of the positive electrode active material of the present invention is that it is composed mainly of particles of the above-described olivine-type lithium manganese phosphate compound in which a portion of the Mn has been replaced by a specific metal. In the case of a battery fabricated using LiMnPO$_4$, in which there has been no substitution of a portion of the Mn by another metal, the discharge capacity declines as the number of charge-discharge cycles increases. However, it has been found that a battery that uses the positive electrode active material of the present invention, in which a portion of the Mn has been replaced by a specific metal, exhibits excellent charge-discharge cycle characteristics. A second characteristic feature of the positive electrode active material of the present invention is that it has a very small particle diameter of 10 to 500 nm. Due to this, the positive electrode active material of the present invention is able to provide a battery that exhibits excellent charge-discharge characteristics.

Various materials, for example, an electroconductive material, may be present on an optional basis on the surface of the particles of the aforementioned olivine-type lithium manganese phosphate compound in order to improve the properties of the ultimately obtained positive electrode active material. In such cases, the particles of the positive electrode active material are constituted of the olivine-type lithium manganese phosphate compound particles and the other material present on the circumference of these particles.

A characteristic feature of the aforementioned olivine-type lithium manganese phosphate compound is the substitution of a portion of the Mn in lithium manganese phosphate (LiMnPO$_4$) by at least one metal M selected from the group consisting of Co, Ni, Fe, Zn, Cu, Ti, Sn, Zr, V, and Al. The x, y, and a that indicate the proportions of the elements in this compound can respectively vary within the numerical ranges given by $0<x<2$, $0<y<1$, and $0<a<1$ so as to strike a charge balance for the compound. While the molar ratio a for the substituting metal can assume a value of 0.2 or more, it is preferably $0<a<0.4$ and more preferably is $0<a<0.2$ when one considers the contribution to improving the battery capacity and the cost of the substituting metal. On the other hand, the molar ratio y for the Mn can be freely established in the range of $0<y<1$, but is ordinarily $0.8<y<1.0$.

A very suitable example of this olivine-type lithium manganese phosphate compound is represented by the following general formula (2)

$$Li_xMn_yM^1_zM^2_wPO_4 \qquad (2)$$

(in the formula, $0<x<2$, $0<y<1$, $0<z<1$, $0<w<1$, $M^1$ is at least one divalent metal element selected from the group consisting of Co, Ni, Fe, Zn, and Cu, and $M^2$ is at least one trivalent or tetravalent metal element selected from the group consisting of Ti, Sn, Zr, V, and Al). A characteristic feature of the compound with general formula (2) is that the substituting metal element M in the compound with general formula (1) has become the combination of a divalent metal element $M^1$ and a trivalent or tetravalent metal element $M^2$.

The molar substitution ratios z and w for the divalent metal element $M^1$ and the trivalent or tetravalent metal element $M^2$ in the general formula (2) given above can be freely established in the ranges of $0<z<1$ and $0<w<1$. Substitution can again be 0.2 or more, but $0<z<0.2$ and $0<w<0.2$ are preferred when one considers the contribution to improving the battery capacity and the cost of the substituting metal. In particular, the crystal structure is readily stabilized when Mn replacement is carried out using $z=w$. On the other hand, the molar ratio y for the Mn can be freely established in the range of $0<y<1$, but is ordinarily $0.8<y<1.0$.

The combination of substituting metals $M^1$ and $M^2$ (indicated as $M^1$-$M^2$) is not particularly limited and can be typically exemplified by Co—Ti, Ni—Ti, Fe—Ti, Co—Sn, Ni—Sn, and so forth. Also included are individual combinations that contain a plurality of selections for $M^1$ and/or a plurality of selections for $M^2$, such as Co—(Ti+Sn), (Ni+Co)—(Ti+Sn), and so forth.

According to their research, the present inventors discovered that the substitution of the Mn in LiMnPO$_4$ by a combination of $M^1$ and $M^2$ tends to yield a positive electrode active material that provides a battery that has better charge-discharge characteristics and better charge-discharge cycling characteristics than either the substitution of Mn by only $M^1$ or only $M^2$ or LiMnPO$_4$ itself lacking a substituting metal.

The use of a trivalent or tetravalent metal element $M^2$ as the substituting metal tends to inhibit interparticle sintering of the olivine-type lithium manganese phosphate compound during production (particularly during the calcination step) and to make it possible to obtain highly electroconductive microparticles. Ti is most preferred among the $M^2$ species. The use of Ti as the substituting metal achieves an excellent sintering inhibiting effect and tends to enable an additional promotion of the microfine-sizing of the particles. It has also been found that substitution of the Mn in the aforementioned olivine-type lithium manganese phosphate compound by the combination of a trivalent or tetravalent metal element $M^2$ and a divalent metal $M^1$ improves the crystallinity of this compound and facilitates Mn redox (oxidation-reduction reaction). Very suitable examples of this combination are combinations in which $M^1$ is at least one divalent metal element selected from Co, Ni, and Fe and $M^2$ is Ti.

The particle diameter of the positive electrode active material must be 10 to 500 nm and is preferably 50 to 200 nm. In those instances where the olivine-type positive electrode active material has a low electroconductivity, a satisfactory capacity is not obtained when this particle diameter exceeds 500 nm.

The positive electrode active material of the present invention is comprised primarily of particles of the olivine-type lithium manganese phosphate compound as described above; however, various materials, for example, an electroconductive material, may also be present on the surface of these particles. Carbon is a typical example of an electroconductive material. As described below, by adding the carbon source to the precursor for the lithium manganese phosphate compound prior to calcination of this precursor and then effecting co-calcination, production can be carried out in a state such that after calcination carbon is bound to the surface of the produced lithium manganese phosphate compound particles. The binding of carbon to the surface of the olivine-type lithium manganese phosphate compound particles functions to compensate for the low electroconductivity of the olivine-type lithium manganese phosphate compound and to achieve an excellent electroconductivity for the positive electrode active material as a whole. The amount of carbon is preferably no more than 20 weight %, more preferably is in the range of 3 to 20 weight %, and even more preferably is in the range of 5 to 15 weight %, in each case with reference to the weight of the positive electrode active material of the present invention.

It is known that carbon particles intrinsically have a large surface area. In addition, when one considers that the presence of carbon on the surface of the olivine-type lithium manganese phosphate compound particles achieves a sintering inhibiting effect and promotes microfine-sizing of the particles, it would ordinarily be thought that the surface area of the obtained positive electrode active material particles as a whole would be increased by the attachment of electroconductive carbon. However, contrary to this expectation in the art, it has been discovered that the positive electrode active material of the present invention exhibits relatively low values for the particle surface area, at 1 to 200 m$^2$/g, particularly 50 to 200 m$^2$/g, and particularly 50 to 100 m$^2$/g (as the BET specific surface area), even when carbon is present on the particle surface. When one considers that the positive electrode active material of the present invention has both a small particle diameter and a small surface area, the conclusion is drawn that the carbon particles occur on the surface of the olivine-type lithium manganese phosphate compound particles in a manner that forms a smooth layer, thus diminishing the asperities on the surface of the positive electrode active material particles.

[The Method of Producing the Positive Electrode Active Material]

The positive electrode active material of the present invention can be produced by the methods for known olivine-type lithium manganese phosphate (LiMnPO$_4$), with the difference that in the present case the salt of the substituting metal is included in the pre-calcination precursor.

Among the positive electrode active materials encompassed by the present invention, the positive electrode active material having carbon on the surface of the olivine-type lithium manganese phosphate compound can in particular be produced, for example, by mixing the carbon source with the pre-calcination precursor for the olivine-type lithium manganese phosphate compound represented by the aforementioned general formula (1) $Li_xMn_yM_aPO_4$ (x, y, a, and M in the formula are defined as above) and calcining the resulting mixture.

(The Pre-calcination Precursor)

There are no particular limitations on the pre-calcination precursor for the olivine-type lithium manganese phosphate compound as long as calcination of the pre-calcination precursor can yield the compound with the aforementioned general formula (1). The pre-calcination precursor can be a mixture of the particulate forms of the salts comprising the precursor or can be obtained by mixing aqueous solutions of the salts comprising the precursor and subjecting the obtained coprecipitated product to treatments such as filtration, washing with water, drying, and so forth. A very suitable pre-calcination precursor is, for example, the coprecipitated product obtained by a process comprising mixing an aqueous manganese salt solution with an aqueous $H_3PO_4$ solution, an aqueous LiOH solution, and an aqueous solution containing the salt of at least one metal selected from the group consisting of Co, Ni, Fe, Zn, Cu, Ti, Sn, Zr, V, and Al and then holding the obtained mixed solution at 50 to 100° C. to produce a coprecipitated product.

There are no particular limitations on the counter-anion in the Mn salt and the M salt(s) ($M^1$ salt, $M^2$ salt), and, for example, the sulfate salt, nitrate salt, hydrochloric acid salt, acetate salt, and so forth can be used. The use of organic acid salts, such as the acetate salt, and the use of the sulfate salt and so forth are preferred from the standpoint of avoiding residual impurities in the obtained positive electrode active material.

Examples of usable phosphate salts and lithium salts are $H_3PO_4$, LiOH, $Li_3PO_4$, $Li_2HPO_4$, $LiH_2PO_4$, and so forth.

The temperature for addition of the aqueous phosphate salt solution and the aqueous lithium salt solution is preferably 10 to 100° C. and more preferably 20 to 50° C.

The ageing carried out after the addition of the aqueous phosphate salt and aqueous lithium salt solutions is done in order to increase the homogeneity of the composition of the coprecipitated product, and the ageing temperature is preferably 50 to 100° C. and more preferably is 70 to 100° C.

When the aforementioned olivine-type lithium manganese phosphate compound is a compound represented by general formula (2) $Li_xMn_yM^1_zM^2_wPO_4$ (x, y, z, w, $M^1$, and $M^2$ in the formula are defined as above), the positive electrode active material of the present invention can be produced, for example, by the methods described below in (1) and (2).

(1) While stirring, the aqueous solutions of the $M^1$ salt and $M^2$ salt, the aqueous $H_3PO_4$ solution, and the aqueous LiOH solution are added in the given sequence to the aqueous Mn salt solution in the temperature range of 10 to 100° C.; this is followed by mixing at 50 to 100° C. to obtain the coprecipitated product; the coprecipitated product is filtered off, washed with water, and dried to obtain a pre-calcination precursor; and the obtained pre-calcination precursor is calcined in an inert gas atmosphere or in a reducing atmosphere.

(2) While stirring, the aqueous solutions of the $M^1$ salt and $M^2$ salt, the aqueous $H_3PO_4$ solution, and the aqueous LiOH solution are added in the given sequence to the aqueous Mn salt solution in the temperature range of 10 to 100° C.; this is followed by stirring while holding at 50 to 100° C. to obtain the coprecipitated product; the coprecipitated product is filtered off, washed with water, and dried to obtain a pre-calcination precursor; and the obtained pre-calcination precursor is mixed with a carbon source and calcined in an inert gas atmosphere or in a reducing atmosphere.

In particular, the use as the pre-calcination precursor of the coprecipitated product obtained by mixing an aqueous Mn solution with an aqueous substituting metal salt solution makes it possible to produce a positive electrode active material that contains olivine-type lithium manganese phosphate microparticles in which the Mn is uniformly substituted and that have a good crystallinity. In addition, very small positive electrode active material particles that have smooth particle surfaces can be obtained by mixing a carbon source into the pre-calcination precursor and subjecting this mixture to calcination in an inert gas atmosphere or a reducing atmosphere. While the microfine-sizing of olivine-type positive electrode active materials is essential for improving the electroconductivity, the problem of a lowered dispersibility in liquid media is created when this microfine-sizing ends up producing a large specific surface area. However, this problem with dispersibility is solved because the method of the present invention for producing a positive electrode active material can produce a positive electrode active material with a small particle size and a relatively small surface area.

(The Calcination Process)

The calcination process is a process in which microscopic particles of the positive electrode active material of the present invention are produced by introducing thermal energy into the precursor mixture in order to cause this mixture to convert into the thermodynamically stable olivine-type lithium manganese phosphate compound and in order to bring about volatilization and elimination of impurities.

This calcination is carried out under an inert gas atmosphere or under a reducing atmosphere. The inert gas can be exemplified by nitrogen, helium, neon, argon, and so forth. The reducing atmosphere can be exemplified by hydrogen and by lower hydrocarbons, for example, $C_{1-4}$ alkanes such as methane, ethane, propane, and butane.

The calcination process preferably comprises a two-step calcination process consisting of a pre-calcination step and a main calcination step. Pre-calcination is generally carried out at temperatures of 200 to 400° C., while the main calcination is generally carried out at temperatures of 400 to 800° C.

In addition, by admixing prior to calcination any of various electroconductive materials (for example, carbon) or a precursor thereof followed by calcination under an inert gas atmosphere or a reducing atmosphere, a very small positive electrode active material can be obtained that has this electroconductive material present on the surface of the olivine-type lithium manganese phosphate particles.

Carbon is an example of the electroconductive material. Carbon is particularly advantageous in terms of ease of acquisition and ease of handling.

The quantity of addition of the carbon source is not limited, but certainly is to be in a range at which the carbon fraction remaining after calcination is not excessive in a positive electrode. Considered with reference to the weight of the positive electrode active material, addition at no more than 20 weight % and particularly in the range of 3 to 20 weight % is desirable, while the range of 5 to 15 weight % is even more preferred.

The carbon source comprises carbon particles and/or a carbon precursor that is converted by calcination to electroconductive carbon. A positive electrode active material that has a relatively low surface area can be produced when a carbon precursor is used as the carbon source.

Known carbon particles can be used without limitation as the carbon particles under consideration, and examples thereof are carbon blacks such as acetylene black and so forth; fullerenes; carbon nanotubes; and so forth.

The carbon precursor can be exemplified by natural and synthetic organic polymer compounds (particularly water-soluble species) such as polyvinyl alcohol, polyolefins, polyacrylonitrile, cellulose, starch, granulated sugar, and so forth, and by polymerizable monomers (particularly unsaturated organic compounds that contain a carbon-carbon double bond) such as acrylonitrile, divinylbenzene, vinyl acetate, and so forth. In particular, the use of polyvinyl alcohol as the carbon source provides a substantial effect with regard to keeping a low specific surface area in the obtained positive electrode active material.

Other carbon precursors suitable for use can be exemplified by sugars, such as glucose and so forth; natural and synthetic organic polymer compounds, such as cellulose acetate and so forth; aromatic compounds such as aromatic carboxylic acids (for example, pyromellitic acid) and so forth; and organic solvents such as dialkyl ketones (for example, acetone) and alcohols (for example, ethanol).

The carbon source may be added to the precursor at any stage of the calcination process; for example, it may be added prior to pre-calcination, or it may be added after pre-calcination but before main calcination, or it may be added at two points, that is, prior to pre-calcination and prior to main calcination.

The execution of main calcination after the addition of the carbon source to the pre-calcined lithium manganese phosphate compound can prevent the carbon source from being foamed by gas generated by decomposition of the lithium manganese phosphate compound during calcination. As a result, the carbon source, residing in a fused state, spreads in a melt state more uniformly over the surface of the lithium manganese phosphate compound, enabling a more uniform deposition of the electroconductive carbon on the surface of the lithium manganese phosphate compound particles. As a consequence, an even better surface electroconductivity is generated for the obtained positive electrode active material and particle-to-particle contact is strongly stabilized.

Moreover, the execution of pre-calcination and main calcination after addition of the carbon source to the coprecipitation product prior to pre-calcination provides the resulting positive electrode active material with an even better surface electroconductivity due to the effect of carbon source addition as described and also provides strong stabilization of particle-to-particle contact. In addition to these effects, the presence of the carbon source during the pre-calcination step enables a lengthening of the time of contact between the coprecipitated product and the carbon source, which produces, through diffusion of the constituent elements of the positive electrode active material that is produced by reaction between the coprecipitated product and carbon source, a uniform mixing of the electroconductive carbon and the lithium manganese phosphate compound particles, thereby forming a carbon-lithium manganese phosphate compound particle composite that is stable and more uniform. Moreover, this effectively stops the increase in particle diameter due to sintering between lithium manganese phosphate compound particles.

[The Nonaqueous Electrolyte Battery]
(Battery Structure)

Figure 34:
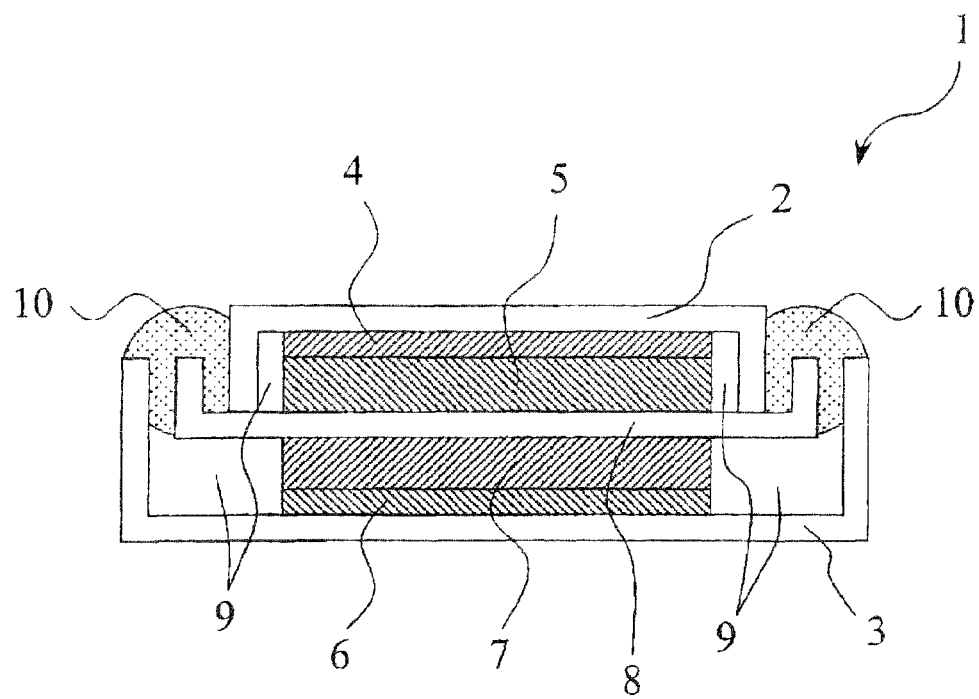
FIG. 34 is a schematic diagram of a nonaqueous electrolyte battery.

An example of a nonaqueous electrolyte battery that uses the positive electrode active material of the present invention will be described with reference to the drawings appended herewith. A cross-sectional drawing that shows a schematic of the battery is given in FIG. 34. Broadly speaking, the nonaqueous electrolyte battery 1 in this figure has a negative electrode member 2, which functions as an external negative electrode for the battery; a positive electrode member 3, which functions as an external positive electrode for the battery; and, situated between the preceding two members in the sequence given, a negative electrode current collector 4, a negative electrode active material 5, a separator 8, a positive electrode active material 7, and a positive current collector 6. The negative electrode member 2 has an approximately cylindrical shape and is configured so as to be able to hold the negative electrode current collector 4 and the negative electrode active material 5 in its interior. The positive electrode member 3, on the other hand, also has an approximately cylindrical shape and is configured so as to be able to hold the positive electrode current collector 6 and the positive electrode active material 7 in its interior. The radial dimension of the positive electrode member 3 and the radial dimension of the separator 8 are set somewhat larger than the radial dimension of the negative electrode member 2, and the peripheral edge of the negative electrode member 2 is therefore overlapped by the peripheral edge of the separator 8 and the peripheral edge of the positive electrode member 3. The space in the interior of the battery is filled with a nonaqueous electrolyte 9, and a sealant 10 is placed in the overlap zone of the peripheral edges of the negative electrode member 2, the separator 8, and the positive electrode member 3, thereby maintaining the interior of the battery in an airtight condition.

For the negative electrode, the negative electrode member 2 forms an external negative electrode; the negative electrode current collector 4 is formed in contact therewith; and a layer of negative electrode active material 5 is formed on the negative electrode current collector. For example, nickel foil, copper foil, and so forth, can be used as the negative electrode current collector. A negative electrode active material capable of lithium insertion/de-insertion is used as the negative electrode active material, and, for example, lithium metal, lithium alloys, lithium-doped electroconductive polymers, layer compounds (carbon materials, metal oxides, and so forth), and the like, are specifically used. The binder present in the negative electrode active material layer can be a resin material as generally known for use as a binder in the negative electrode active material layer of nonaqueous electrolyte batteries of this type. In particular, because lithium metal foil can be used not only for the negative electrode active material, but also for the negative electrode current collector, a simple and convenient battery structure can be elaborated by using lithium metal foil for the negative electrode.

For the positive electrode, the positive electrode member 3 forms an external positive electrode; the positive electrode current collector 6 is formed in contact therewith; and a layer of positive electrode active material 7 is formed on the positive electrode current collector. The positive electrode active material of the present invention as described hereinabove is used as the positive electrode active material. The positive electrode current collector can be, for example, aluminum foil and so forth. The binder present in the positive electrode active material layer can be a resin material, for example, polyvinylidene fluoride and so forth, as generally known for use as a binder in the positive electrode active material layer of nonaqueous electrolyte batteries of this type. The positive electrode active material layer can contain an electroconductive material in order to raise the electroconductivity. This electroconductive material can be exemplified by graphite, acetylene black, and so forth.

The separator 8 divides the positive electrode from the negative electrode, and those materials generally known for use as a separator in nonaqueous electrolyte batteries of this type can be used. For example, a polymer film of, e.g., polypropylene, or a porous polyethylene carbonate membrane, and so forth, can be used. In addition, the separator is desirably as thin as possible given the relationship between lithium ion conductivity and energy density. In specific terms, the separator thickness is, for example, preferably no more than 50 μm.

The resins generally known for use as sealants for the positive electrode active material layer of nonaqueous electrolyte batteries of this type can be used as the sealant 10.

The nonaqueous electrolyte can assume various forms and can be not only a liquid electrolyte, but can also be a solid electrolyte, a solvent-containing electrolyte gel, and so forth. Solutions obtained by dissolving an electrolyte in an aprotic nonaqueous solvent are used as the liquid electrolyte. The nonaqueous solvent can be exemplified by cyclic carbonates such as ethylene carbonate, propylene carbonate, butylene carbonate, vinylene carbonate, and so forth; chain carbonates such as dimethyl carbonate, diethyl carbonate, and dipropyl carbonate; and by γ-butyrolactone, sulfolane, 1,2-dimethoxyethane, 1,2-diethoxyethane, 2-methyltetrahydrofuran, 3-methyl-1,3-dioxolane, methyl propionate, methyl butyrate, and so forth. In particular, the use of cyclic carbonates such as ethylene carbonate, propylene carbonate, vinylene carbonate, and so forth, and chain carbonates such as dimethyl carbonate, diethyl carbonate, dipropyl carbonate, and so forth, is preferred from the standpoint of voltage stability. A single such nonaqueous solvent can be used or a mixture of two or more can be used. A lithium salt, for example, $LiPF_6$, $LiClO_4$, $LiAsF_6$, $LiBF_4$, $LiCF_3SO_3$, $LiN(CF_3SO_2)_2$, and so forth, can be used as the electrolyte. The use of $LiPF_6$ and $LiBF_4$ is preferred among the preceding lithium salts. The solid electrolyte can be exemplified by solid inorganic electrolytes such as lithium nitride, lithium iodide, and so forth, and by organic polymer electrolytes such as poly(ethylene oxide), poly(methacrylate), poly(acrylate), and so forth. In addition, there are no particular restrictions on the material that can be used to form an electrolyte gel as long as this material can absorb a liquid electrolyte as described above with gelation; examples here are fluoropolymers such as poly(vinylidene fluoride), vinylidene fluoride/hexafluoropropylene copolymer, and so forth.

(The Method of Battery Production)

A nonaqueous electrolyte battery that uses the positive electrode active material of the present invention can be produced, for example, as follows.

The method of producing the negative electrode will be described first. A slurry is prepared by dispersing the negative electrode active material and binder in a solvent. The obtained slurry is uniformly coated on the current collector and dried thereon to form a layer of negative electrode active material. The resulting laminate comprising the negative electrode current collector and the negative electrode active material layer is then installed within the negative electrode member in such a manner that the negative electrode current collector and the interior surface of the negative electrode member are in contact, thereby forming the negative electrode. In addition, lithium metal foil can also be directly used as the negative electrode active material and the negative electrode current collector as described above.

The method of producing the positive electrode will now be described. A slurry is prepared by dispersing the positive electrode active material of the present invention, electroconductive material, and binder in a solvent. This slurry is uniformly coated on the current collector and dried thereon to form a positive electrode active material layer. The resulting laminate comprising the positive electrode current collector and the positive electrode active material layer is then installed in the positive electrode member in such a manner that the positive electrode current collector is in contact with the inner surface of the positive electrode member, thereby forming the positive electrode.

When a liquid nonaqueous electrolyte is used, the liquid nonaqueous electrolyte is prepared by dissolving the electrolyte salt in a nonaqueous solvent.

The negative electrode and positive electrode prepared as described above are then stacked on one another with a separator interposed between the negative electrode active material layer and the positive electrode active material layer; the nonaqueous electrolyte is then introduced; and the nonaqueous electrolyte battery is completed by sealing the battery interior with sealant.

The nonaqueous electrolyte battery of the present invention is not particularly limited to the configuration discussed above and can have, inter alia, a cylindrical, square, coin, or button shape, and can be executed in various sizes, for example, thin, large-scale, and so forth. In addition, the present invention can be used for primary batteries and secondary batteries.

EXAMPLES

The present invention is described in detail herebelow based on examples, but the present invention is not limited to these examples.

The following methods were used in the examples to analyze the positive electrode active materials and the nonaqueous electrolyte batteries.

(X-ray Diffraction)

x-ray diffraction (XRD) measurement of the positive electrode active material was carried out using a CoKα Rigaku RINT 2200V (Rigaku Corporation).

(Specific Surface Area)

The specific surface area of the positive electrode active material was measured by the BET method using a Multisorb 12, a fully automated instrument for surface area measurement from Yuasa Ionics Inc.

(Analysis of the Metal Composition)

For the metal components other than Li, the metal composition analysis was carried out by fluorescent x-ray analysis using a ZSX100e fluorescent x-ray analyzer from Rigaku Corporation. The Li was measured by ICP emission spectrometry (SPS1500VR ICP emission spectrometer from Seiko Instruments Inc.). The calculations were carried in mol % with reference to Mn.

(Particle Diameter)

The particle diameter of the positive electrode active material was obtained as follows. 200 of the particles appearing on a photograph taken with a scanning electron microscope (SEM, DS130 from Topcon Electron Beam Service Co., Ltd.) were randomly selected and the particle diameter of each particle was measured. An average value was calculated from these measured values, and this average value was used as the particle diameter.

(Constant-current Charge-discharge Testing)

Constant-current charge-discharge testing of the batteries was carried out at 25° C. using an applied current of 0.076 mA/cm² and a potential range of 3000 to 4500 mV. The potential (mV) and total capacity per unit gram of the positive electrode active material (mAh/g) recorded on the first charge-discharge cycle were designated as the initial charge-discharge characteristics. The variation in the charge-discharge characteristics during repetitive charge-discharge of the battery (the cycle characteristics) was determined by recording the potential (mV) and total capacity per unit gram of the positive electrode active material (mAh/g) for each charge-discharge cycle while carrying out repetitive charge-discharge.

The charge-discharge characteristic of the battery was evaluated as the discharge capacity (mAh/g) at 3000 mV during the initial discharge. The cycle characteristics of the battery were evaluated through the change, as a function of the number of charge-discharge cycles, in the charge capacity (mAh/g) at 4500 mV during charging and the discharge capacity (mAh/g) at 3000 mV during discharge.

Example 1

Production of the positive electrode active material:

0.270 L of a 1.0 mol/L aqueous solution of $Mn(CH_3COO)_2$ was charged to a one-liter reactor, and to this were added 0.015 L of a 1.0 mol/L aqueous solution of $CoSO_4$ and 0.015 L of a 1.0 mol/L aqueous solution of $Ti(SO_4)_2$ with thorough stirring. 0.148 L of a 2.04 mol/L aqueous solution of $H_3PO_4$ was then added dropwise at 40° C. and over 30 minutes and mixing was carried out for an additional 30 minutes. 0.450 L of a 2.0 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven; the resulting sample was ground in a mortar. 10 g of the resulting sample was pre-calcined for 24 hours at 350° C. under an $N_2$ blanket and was thereafter subjected to main calcination for 24 hours at 700° C. under an $N_2$ blanket to give the positive electrode active material.

The x-ray diffractogram of the obtained positive electrode active material ($LiMn_{0.90}Co_{0.05}Ti_{0.05}PO_4$) is shown in FIG. 1. The presence of an olivine-type lithium manganese phosphate single phase was confirmed from the x-ray diffractogram.

The BET specific surface area of the obtained sample was 9.8 $m^2$/g.

Figure 2:
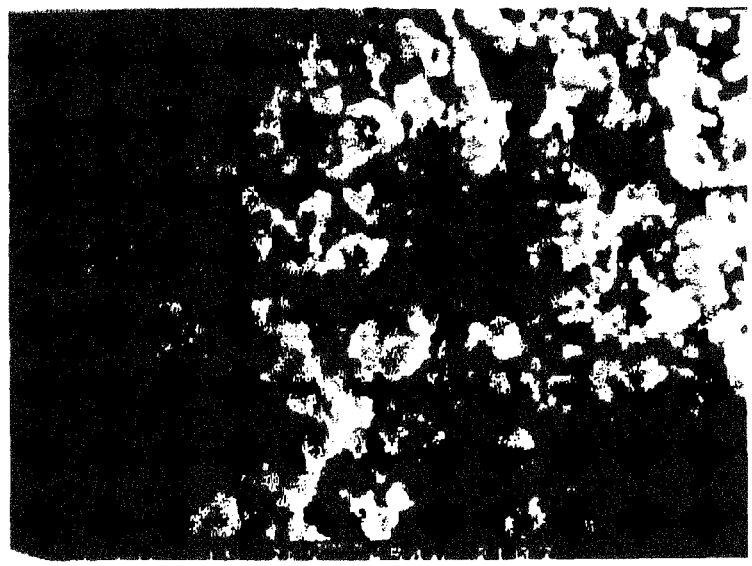
FIG. 2 is a scanning electron photomicrograph of the positive electrode active material produced in Example 1.

An SEM photograph of the obtained positive electrode active material is shown in FIG. 2. The average particle diameter of the obtained positive electrode active material was 183 nm.

The properties of the obtained positive electrode active material are shown in Table 1 (the carbon content in the table is given in weight %).

Figure 35:
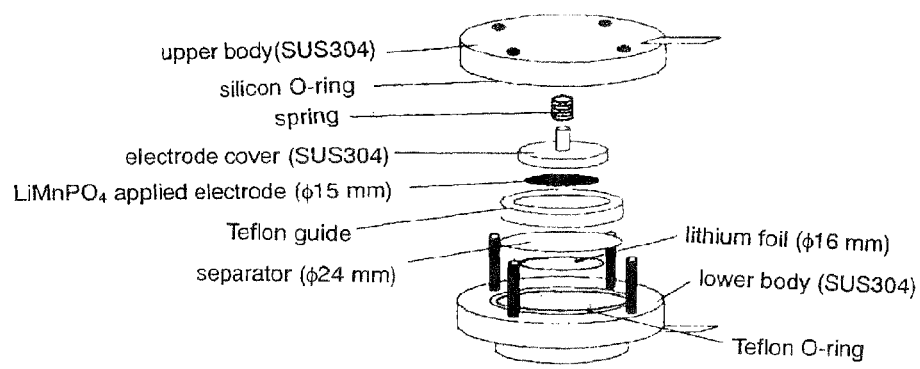
FIG. 35 is a schematic diagram of a nonaqueous electrolyte battery fabricated for use in constant-current charge-discharge testing.

Fabrication of a lithium secondary battery:

A lithium secondary battery was fabricated using the positive electrode active material obtained as described above. Using N-methyl-2-pyrrolidone as the solvent, positive electrode active material: electroconductive material (acetylene black: Denka Black powder from Denki Kagaku Kogyo Kabushiki Kaisha, average particle size=35 nm, specific surface area=68 $m^2$/g):binder (polyvinylidene fluoride) were mixed at a weight ratio of 72:18:10 and kneaded into a paste-like slurry. This slurry was coated on an aluminum foil current collector and dried; punching into a circle with a diameter of 15 mm then gave a positive electrode. The mass of the positive electrode active material was 9 mg. A basic lithium secondary battery was then fabricated using a porous polyethylene carbonate membrane (diameter=24 mm, thickness=25 μm) for the separator, a solution prepared by dissolving $LiPF_6$ to a concentration of 1 M in a mixed solvent of ethylene carbonate and dimethyl carbonate (volumetric ratio=1:1) as liquid electrolyte, and lithium metal punched into a circle (diameter=16 mm, thickness=0.2 mm) as the negative electrode. The basic lithium secondary battery fabricated in this example is shown schematically in FIG. 35.

Figure 3:
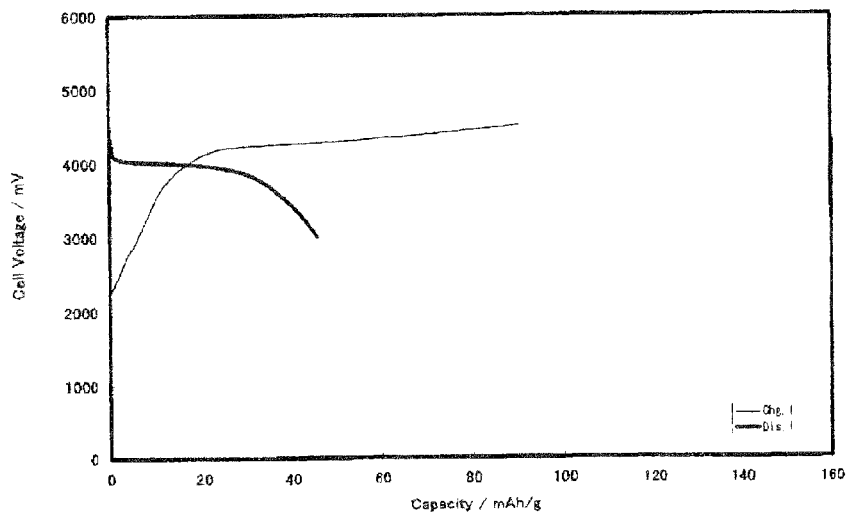
FIG. 3 is a graph that shows the results of a constant-current charge-discharge test on the basic lithium secondary battery fabricated in Example 1.

The basic lithium secondary battery obtained as described above was submitted to the charge-discharge testing. The initial charge-discharge characteristics are shown in Table 2 and FIG. 3 (in the figures, "Chg. 1" indicates the initial charging curve, while "Dis. 1" indicates the initial discharge curve).

Example 2

Figure 4:
FIG. 4 is a scanning electron photomicrograph of the positive electrode active material produced in Example 2.

0.270 L of a 1.0 mol/L aqueous solution of $Mn(CH_3COO)_2$ was charged to a one-liter reactor, and to this were added 0.015 L of a 1.0 mol/L aqueous solution of $CoSO_4$ and 0.015 L of a 1.0 mol/L aqueous solution of $Ti(SO_4)_2$ with thorough stirring. 0.148 L of a 2.04 mol/L aqueous solution of $H_3PO_4$ was then added dropwise at 40° C. and over 30 minutes and mixing was carried out for an additional 30 minutes. 0.450 L of a 2.0 mol/L aqueous LiOH solution was then added dropwise over 30 minutes, followed by heating to 100° C. 20.0 g polyvinyl alcohol (PVA, Kishida Chemical Co., Ltd., degree of polymerization=1900 to 2100) was added and stirring was carried out for 1 hour. The resulting coprecipitated product was filtered off, washed with 1 L deionized water, dried for 12 hours in a 140° C. oven, and ground in a mortar. 10 g of the resulting sample was pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 4.

Figure 5:
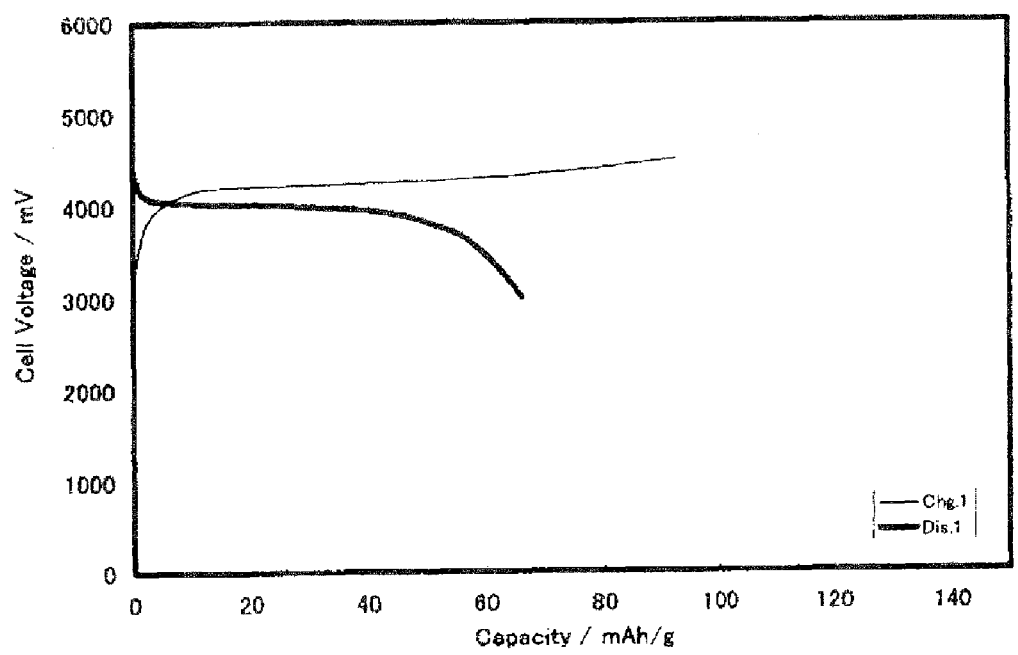
FIG. 5 is a graph that shows the results of a constant-current charge-discharge test on the basic lithium secondary battery fabricated in Example 2.

Constant-current charge-discharge testing was carried out as in Example 1. The initial charge-discharge characteristics are shown in Table 2 and FIG. 5.

Example 3

Figure 6:
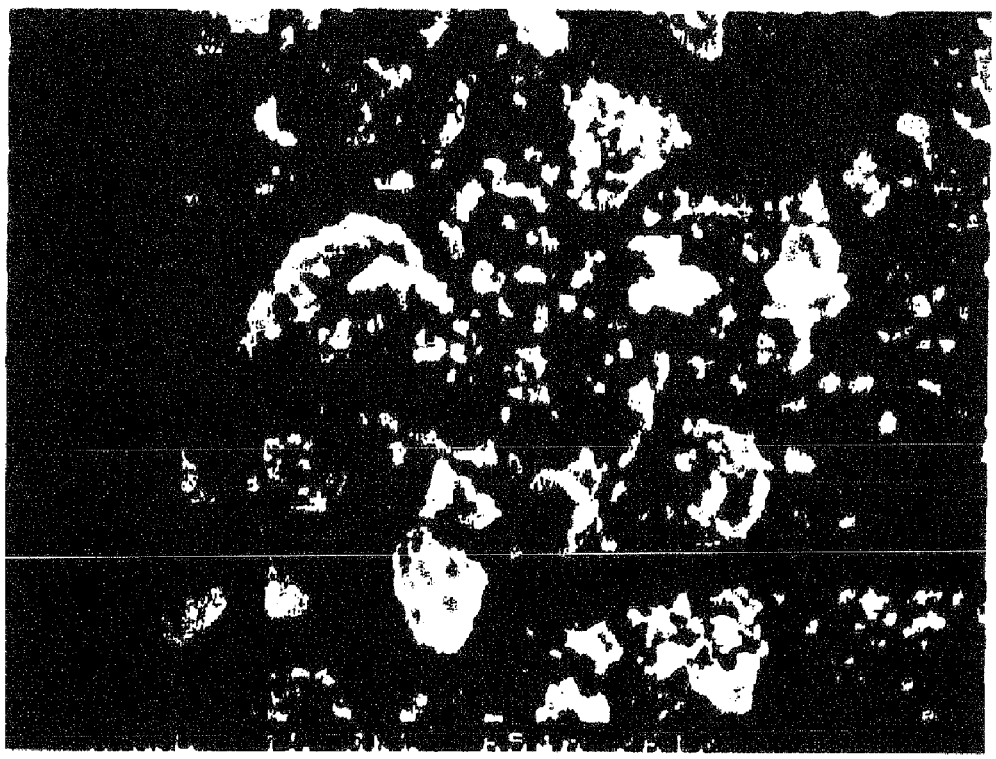
FIG. 6 is a scanning electron photomicrograph of the positive electrode active material produced in Example 3.

0.270 L of a 1.0 mol/L aqueous solution of $Mn(CH_3COO)_2$ was charged to a one-liter reactor, and to this were added 0.034 L of a 1.0 mol/L aqueous solution of $CoSO_4$ and 0.034 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g PVA and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 6.

Figure 7:
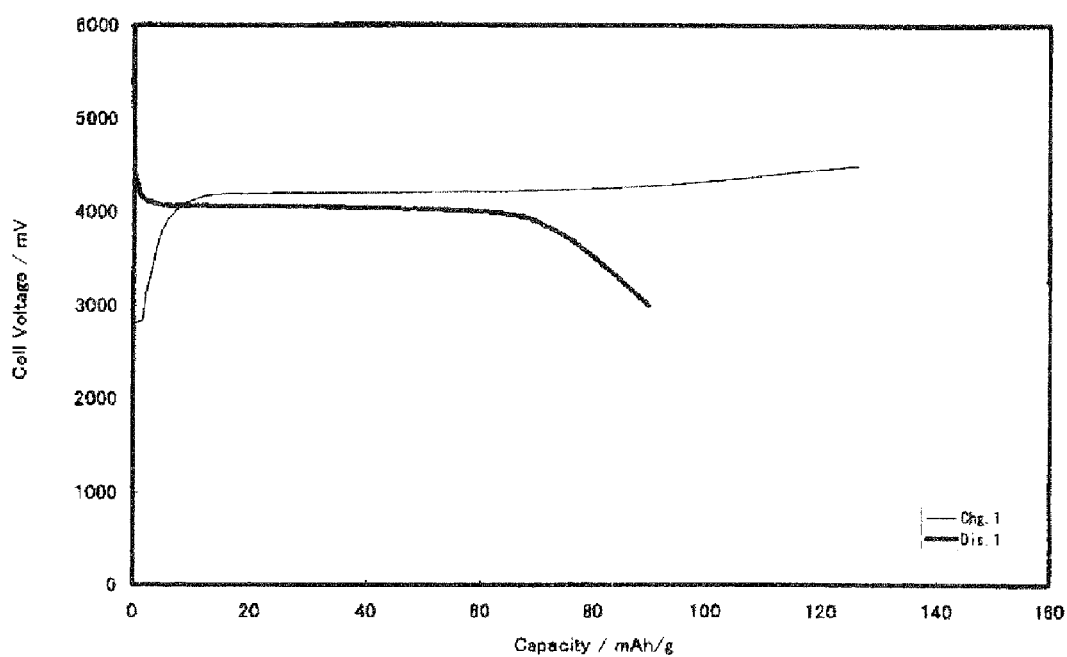
FIG. 7 is a graph that shows the results of a constant-current charge-discharge test on the basic lithium secondary battery fabricated in Example 3.
Figure 32:
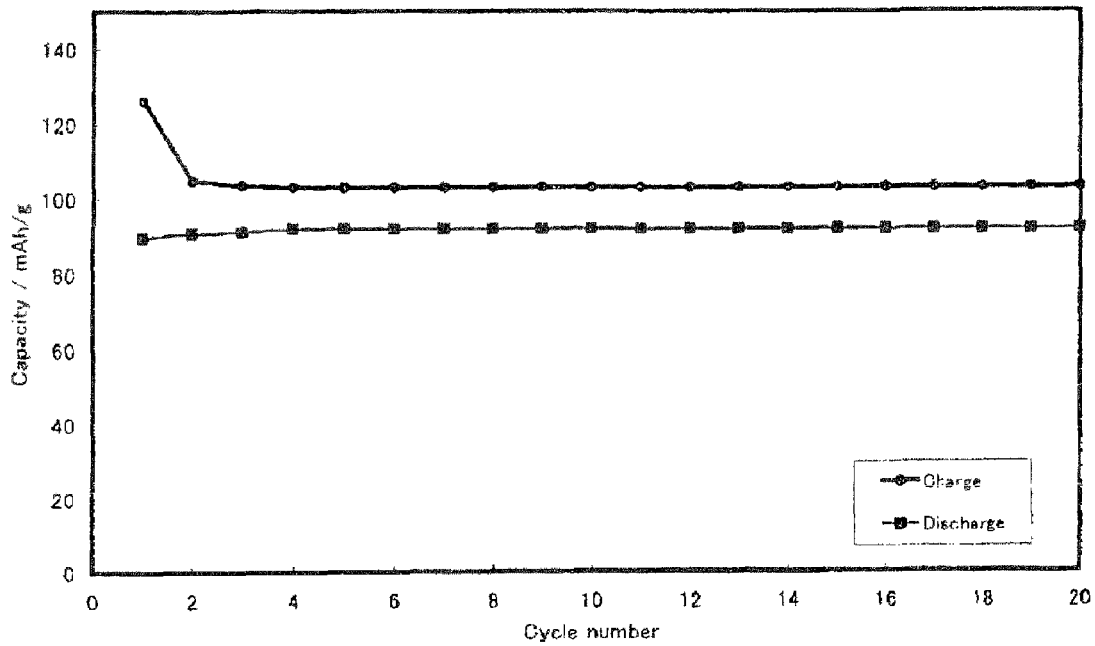
FIG. 32 is a graph that shows the results of a constant-current charge-discharge cycle test on the basic lithium secondary battery fabricated in Example 3.

Constant-current charge-discharge testing was carried out as in Example 1. The initial charge-discharge characteristics are shown in Table 2 and FIG. 7, and the cycle characteristics are shown in FIG. 32.

Example 4

Figure 8:
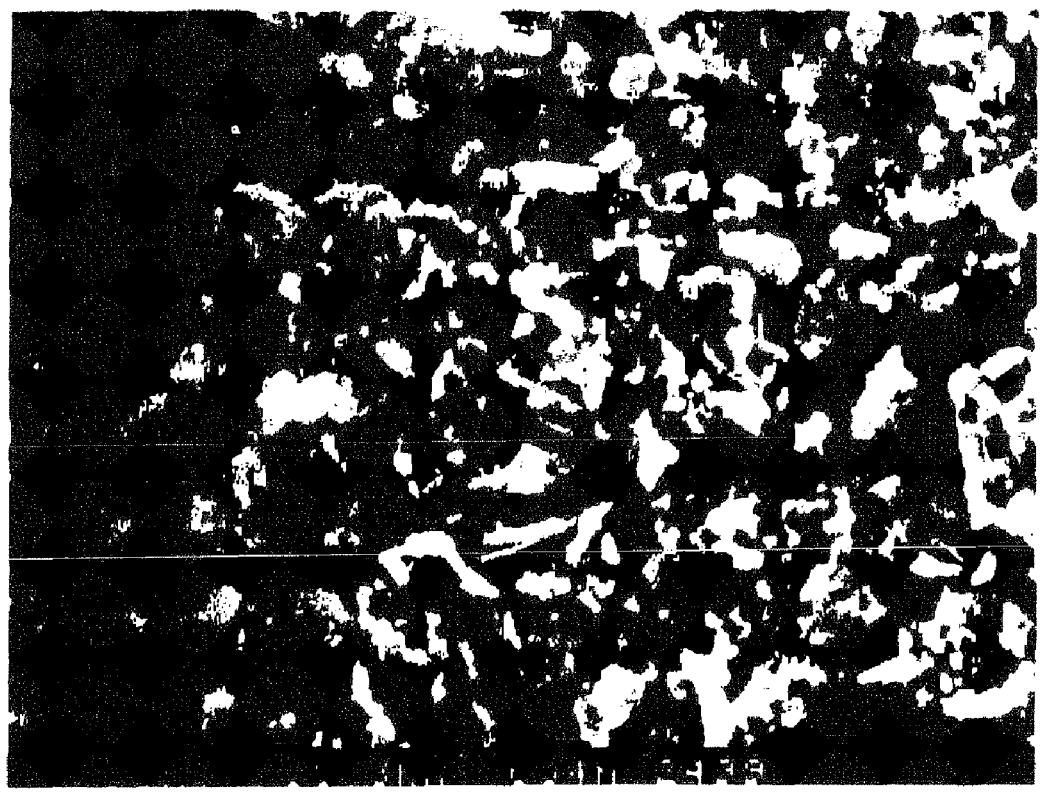
FIG. 8 is a scanning electron photomicrograph of the positive electrode active material produced in Example 4.

0.200 L of a 1.0 mol/L aqueous solution of $Mn(CH_3COO)_2$ was charged to a one-liter reactor, and to this were added 0.067 L of a 1.0 mol/L aqueous solution of $CoSO_4$ and 0.067 L of a 1.0 mol/L aqueous solution of $Ti(SO_4)_2$ with thorough stirring. 0.147 L of a 2.04 mol/L aqueous solution of $H_3PO_4$ was then added dropwise at 40° C. and over 30 minutes and mixing was carried out for an additional 30 minutes. 0.450 L of a 2.0 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g PVA and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 8.

Figure 9:
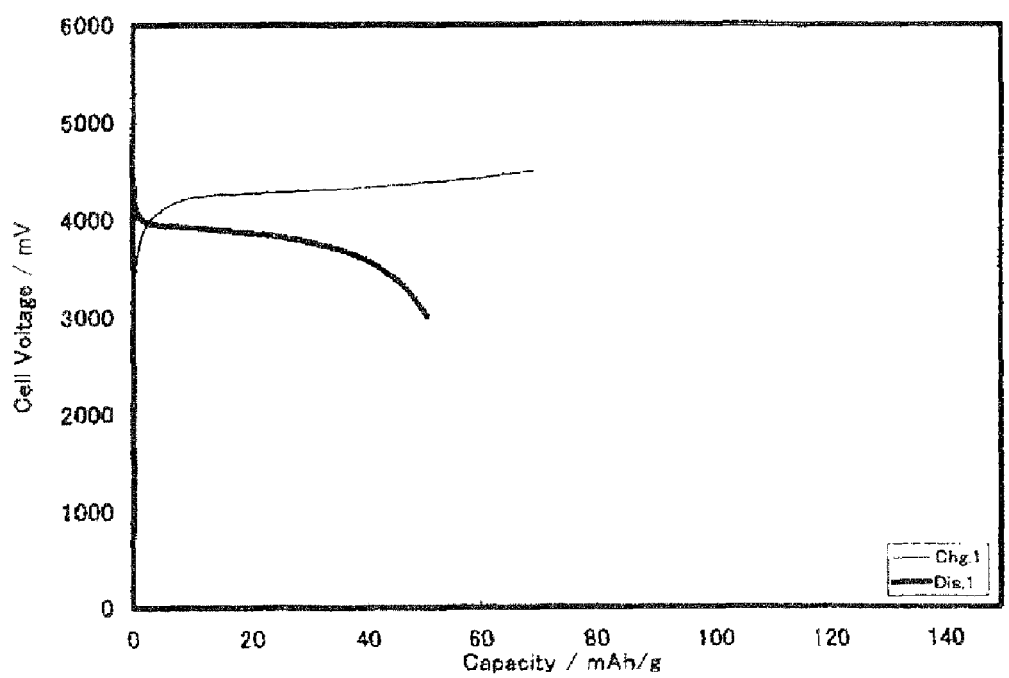
FIG. 9 is a graph that shows the results of a constant-current charge-discharge test on the basic lithium secondary battery fabricated in Example 4.

Constant-current charge-discharge testing was carried out as in Example 1. The initial charge-discharge characteristics are shown in Table 2 and FIG. 9.

Example 5

Figure 10:
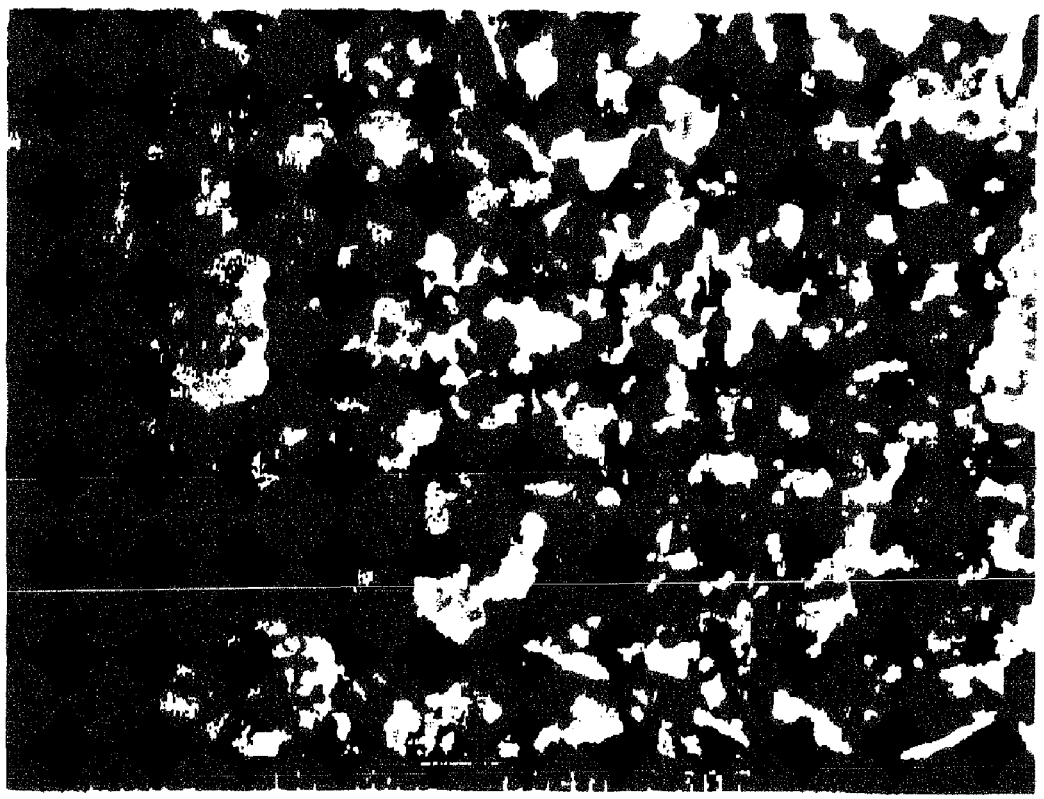
FIG. 10 is a scanning electron photomicrograph of the positive electrode active material produced in Example 5.

0.270 L of a 1.0 mol/L aqueous solution of $Mn(CH_3COO)_2$ was charged to a one-liter reactor, and to this were added 0.034 L of a 1.0 mol/L aqueous solution of $Ni(CH_3COO)_2$ and 0.034 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.405 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 8.20 g PVA and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 10.

Figure 11:
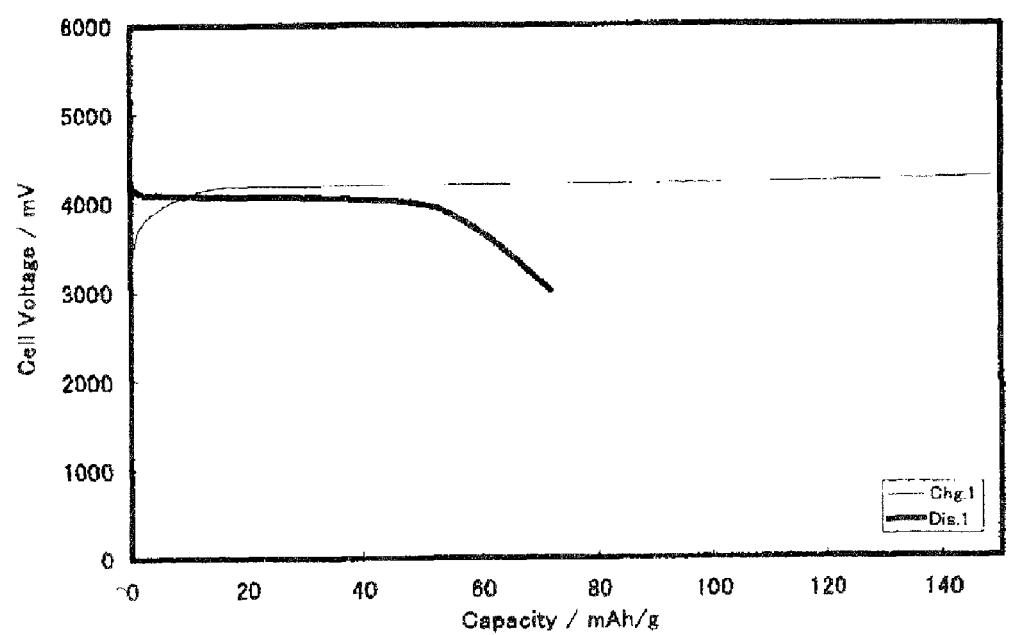
FIG. 11 is a graph that shows the results of a constant-current charge-discharge test on the basic lithium secondary battery fabricated in Example 5.

Constant-current charge-discharge testing was carried out as in Example 1. The initial charge-discharge characteristics are shown in Table 2 and FIG. 11.

Example 6

Figure 12:
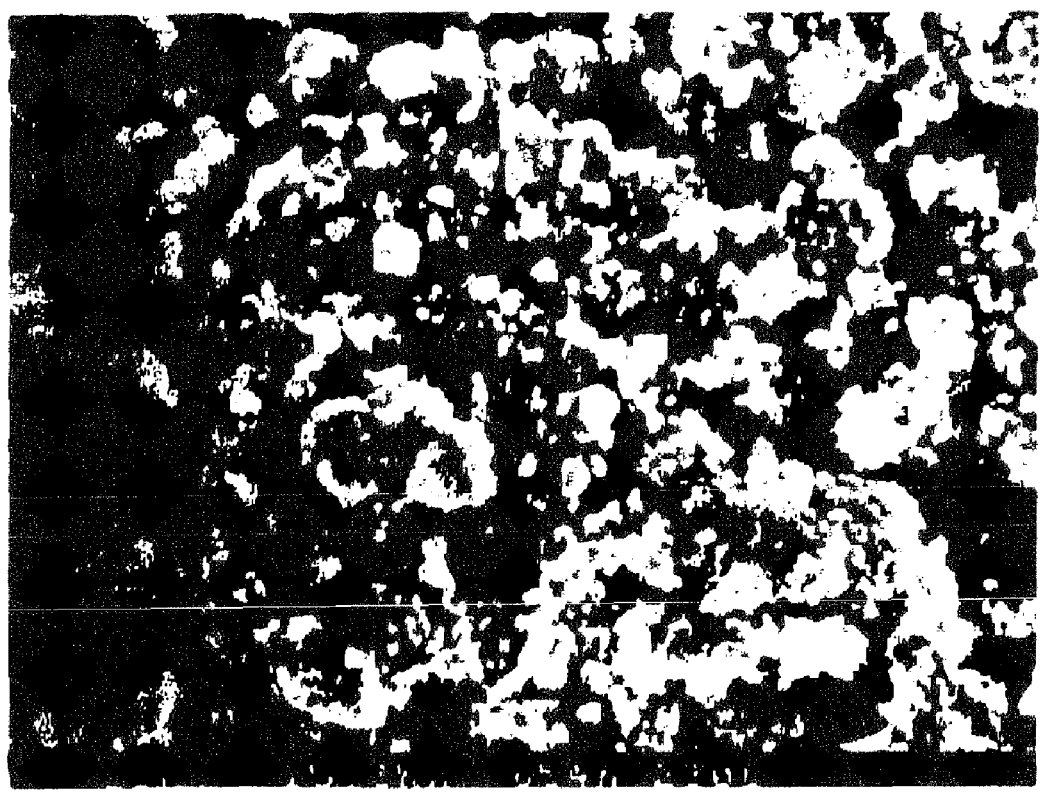
FIG. 12 is a scanning electron photomicrograph of the positive electrode active material produced in Example 6.

0.270 L of a 1.0 mol/L aqueous solution of $Mn(CH_3COO)_2$ was charged to a one-liter reactor, and to this were added 0.034 L of a 1.0 mol/L aqueous solution of $FeCl_3$ and 0.034 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g PVA and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 12.

Figure 13:
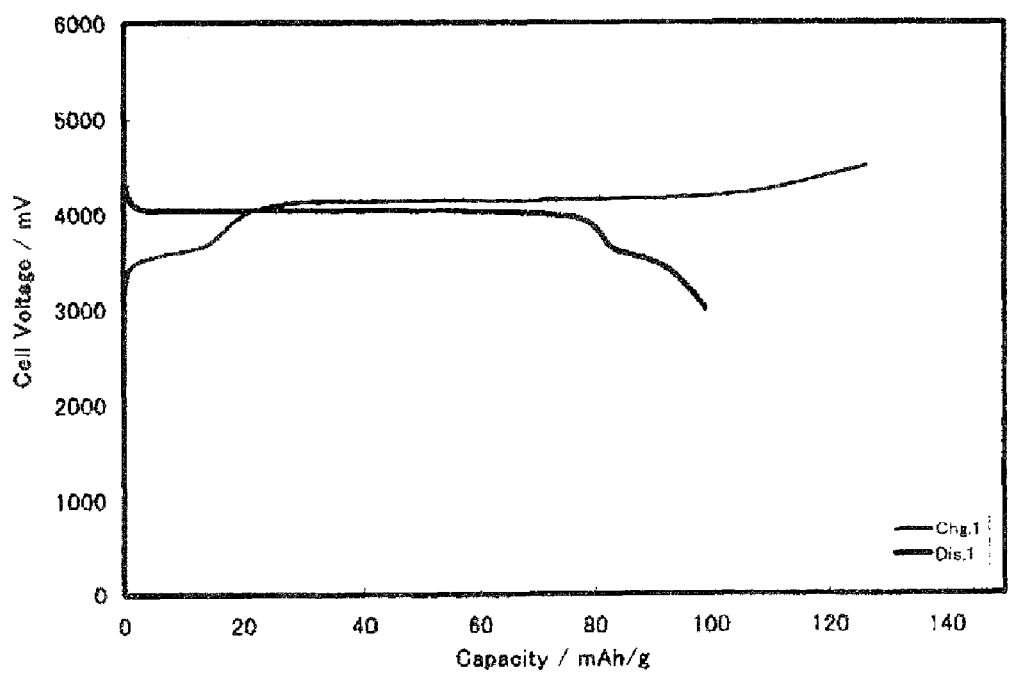
FIG. 13 is a graph that shows the results of a constant-current charge-discharge test on the basic lithium secondary battery fabricated in Example 6.

Constant-current charge-discharge testing was carried out as in Example 1. The initial charge-discharge characteristics are shown in Table 2 and FIG. 13.

Example 7

Figure 14:
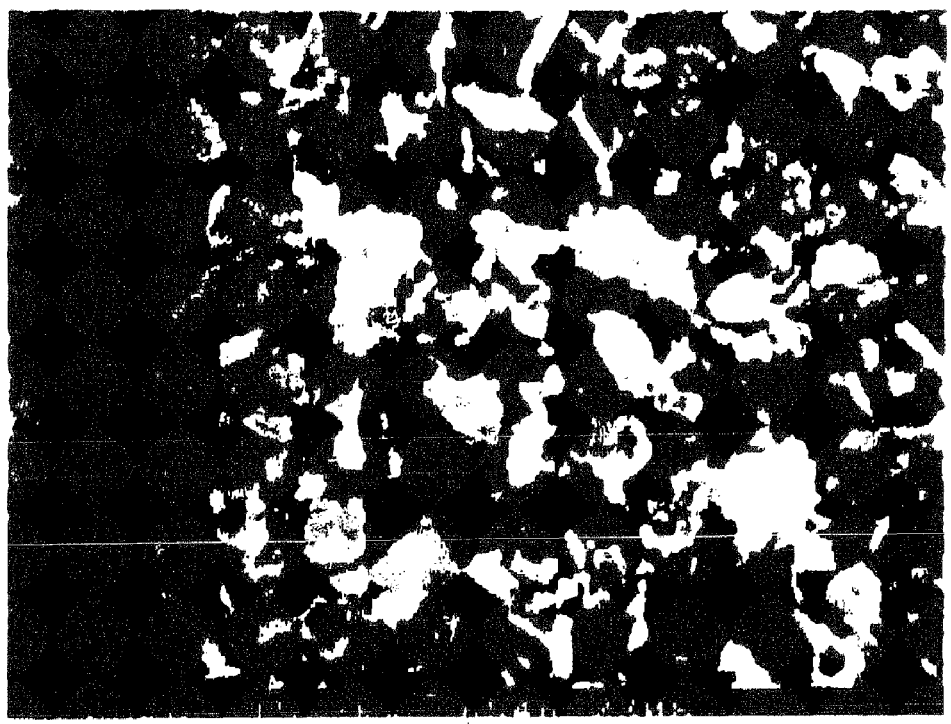
FIG. 14 is a scanning electron photomicrograph of the positive electrode active material produced in Example 7.

The procedure of Example 3 was carried out, but in this example changing the added carbon precursor from PVA to starch (Wako Pure Chemical Industries, Ltd., soluble starch, first grade). The resulting sample was analyzed as in Example 1. The results from the compositional analysis and x-ray diffraction measurement, the measured specific surface area, and the average particle diameter are shown in Table 1; the SEM photograph is shown in FIG. 14.

Figure 15:
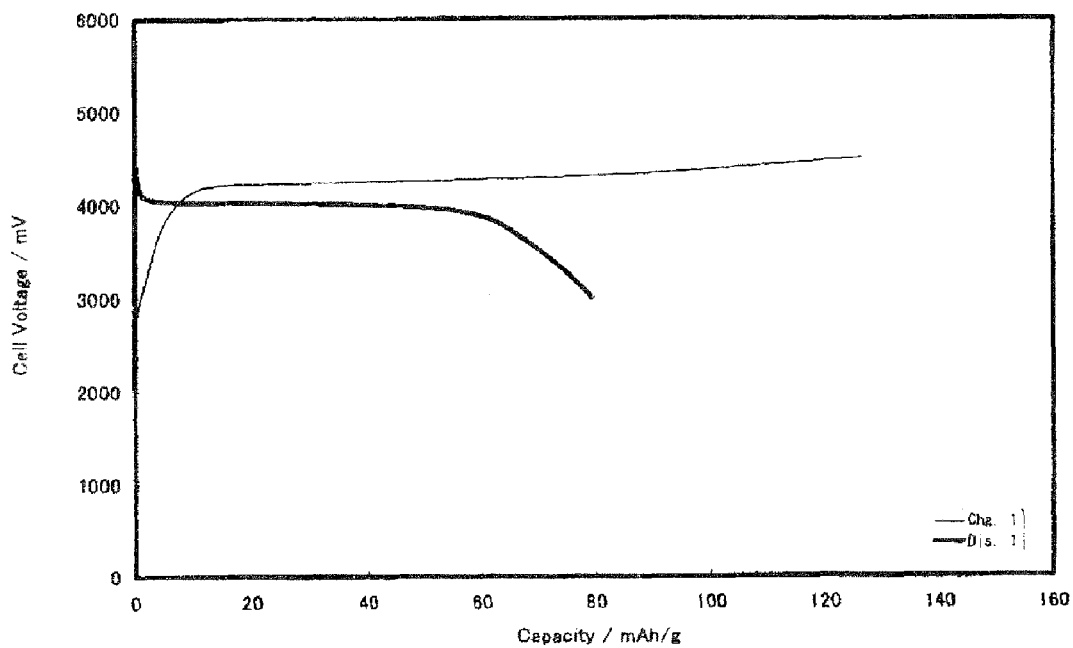
FIG. 15 is a graph that shows the results of a constant-current charge-discharge test on the basic lithium secondary battery fabricated in Example 7.

Constant-current charge-discharge testing was carried out as in Example 1. The initial charge-discharge characteristics are shown in Table 2 and FIG. 15.

Example 8

Figure 16:
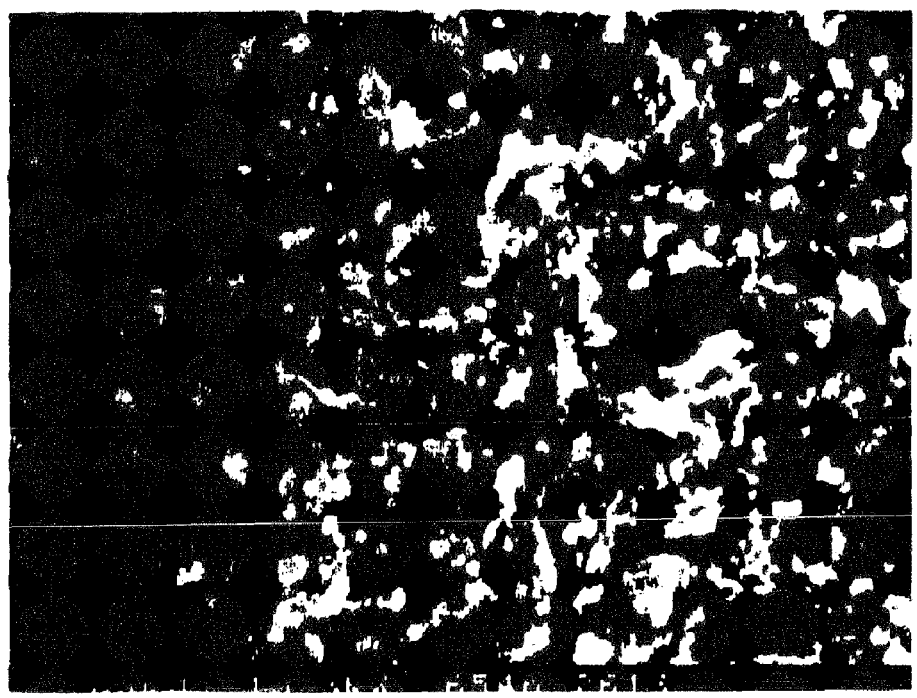
FIG. 16 is a scanning electron photomicrograph of the positive electrode active material produced in Example 8.

The procedure of Example 3 was carried out, but in this case changing the added carbon precursor from PVA to granulated sugar. The resulting sample was analyzed as in Example 1. The results from the compositional analysis and x-ray diffraction measurement, the measured specific surface area, and the average particle diameter are shown in Table 1; the SEM photograph is shown in FIG. 16.

Figure 17:
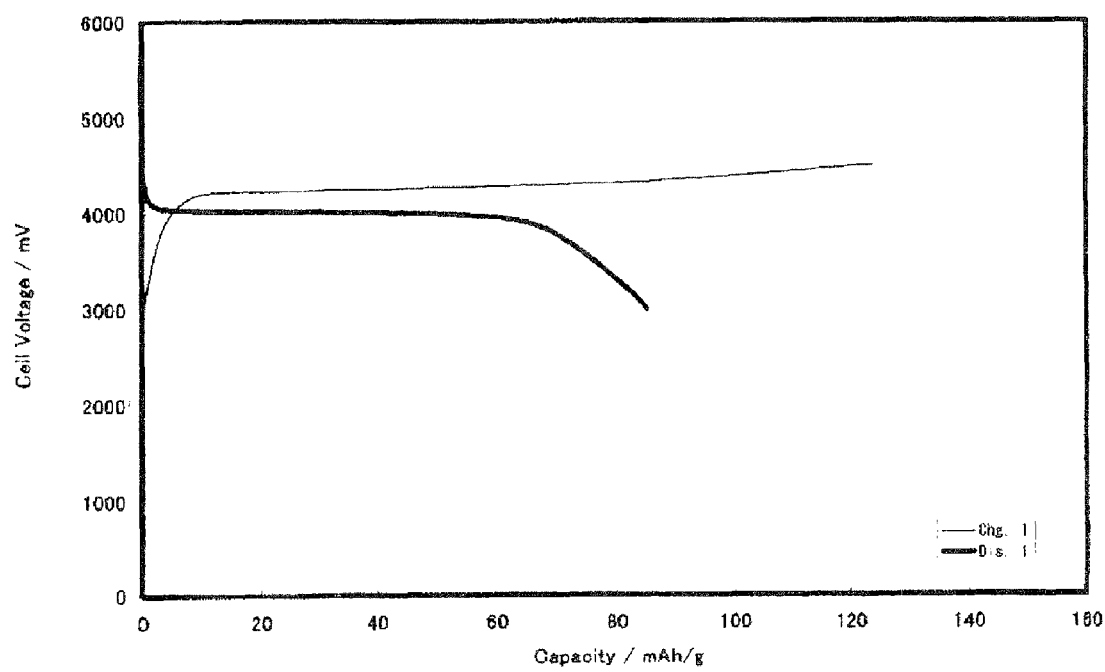
FIG. 17 is a graph that shows the results of a constant-current charge-discharge test on the basic lithium secondary battery fabricated in Example 8.

Constant-current charge-discharge testing was carried out as in Example 1. The initial charge-discharge characteristics are shown in Table 2 and FIG. 17.

Example 9

Figure 18:
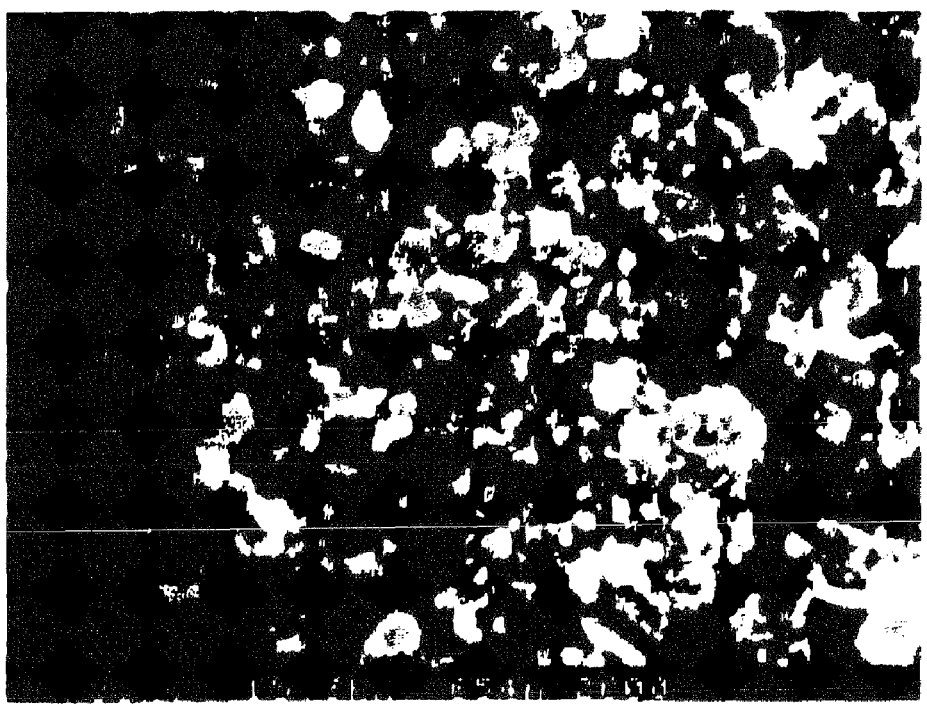
FIG. 18 is a scanning electron photomicrograph of the positive electrode active material produced in Example 9.

0.270 L of a 1.0 mol/L aqueous solution of $Mn(CH_3COO)_2$ was charged to a one-liter reactor, and to this were added 0.015 L of a 1.0 mol/L aqueous solution of $CoSO_4$ and 0.015 L of a 1.0 mol/L aqueous solution of $NiSO_4$ with thorough stirring. 0.148 L of a 2.04 mol/L aqueous solution of $H_3PO_4$ was then added dropwise at 40° C. and over 30 minutes and mixing was carried out for an additional 30 minutes. 0.450 L of a 2.0 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g PVA and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 18.

Figure 19:
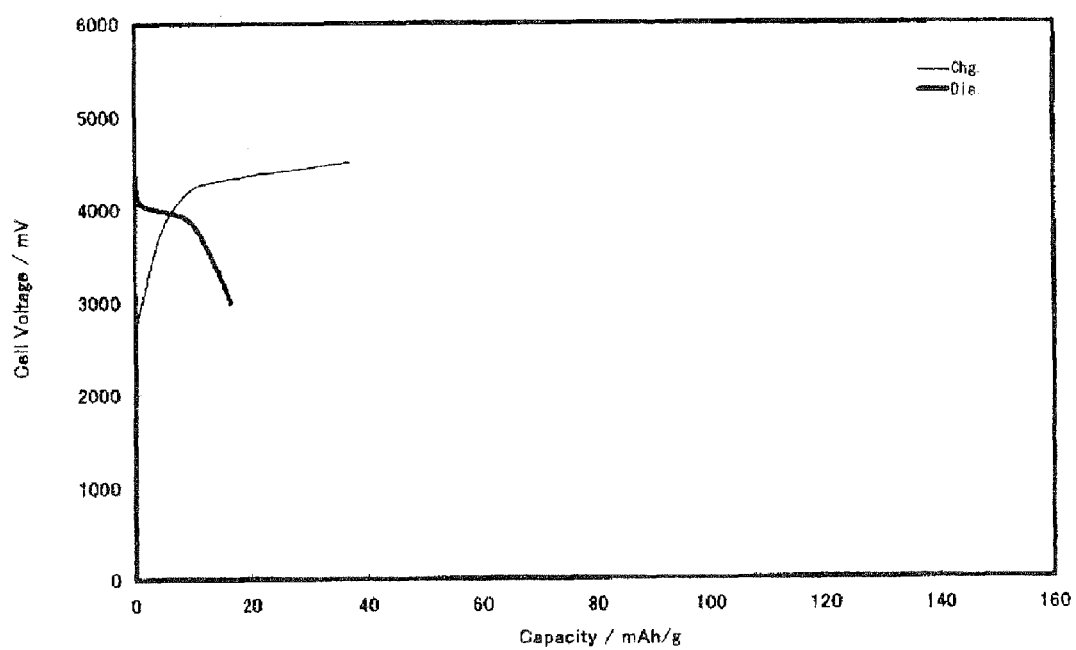
FIG. 19 is a graph that shows the results of a constant-current charge-discharge test on the basic lithium secondary battery fabricated in Example 9.

Constant-current charge-discharge testing was carried out as in Example 1. The initial charge-discharge characteristics are shown in Table 2 and FIG. 19.

Example 10

Figure 20:
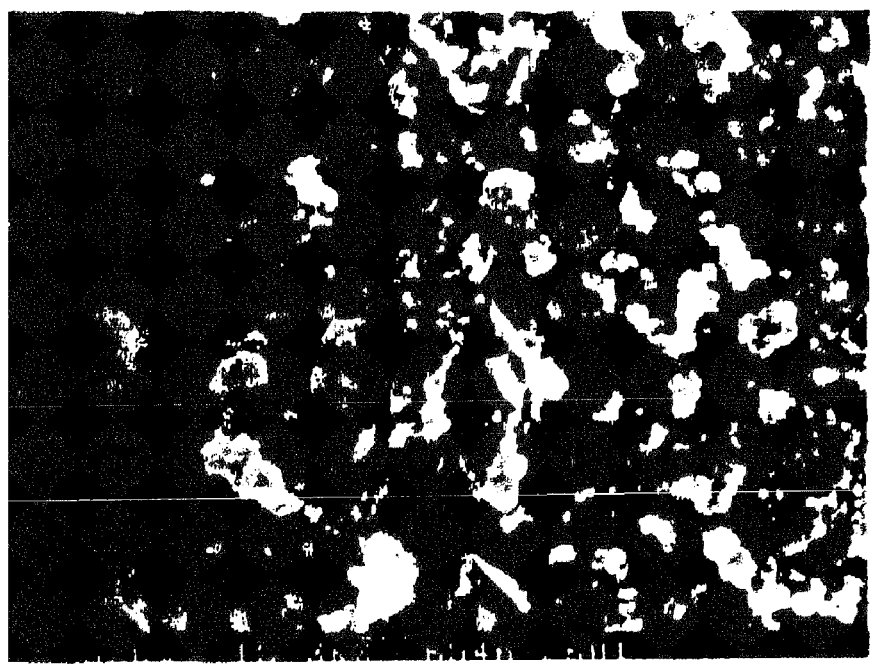
FIG. 20 is a scanning electron photomicrograph of the positive electrode active material produced in Example 10.

0.270 L of a 1.0 mol/L aqueous solution of $Mn(CH_3COO)_2$ was charged to a one-liter reactor, and to this were added 0.015 L of a 1.0 mol/L aqueous solution of FeCl$_3$ and 0.015 L of a 1.0 mol/L aqueous solution of Co(CH$_3$COO)$_2$ with thorough stirring. 0.148 L of a 2.04 mol/L aqueous solution of H$_3$PO$_4$ was then added dropwise at 40° C. and over 30 minutes and mixing was carried out for an additional 30 minutes. 0.450 L of a 2.0 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 8.20 g PVA and 50 mL deionized water with thorough mixing. This sample was dried for 12 hours in a 140° C. oven. The resulting mixture was ground with a mortar. It was then pre-calcined for 24 hours at 350° C. under an N$_2$ blanket and was thereafter subjected to main calcination for 24 hours at 700° C. under an N$_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 20.

Figure 21:
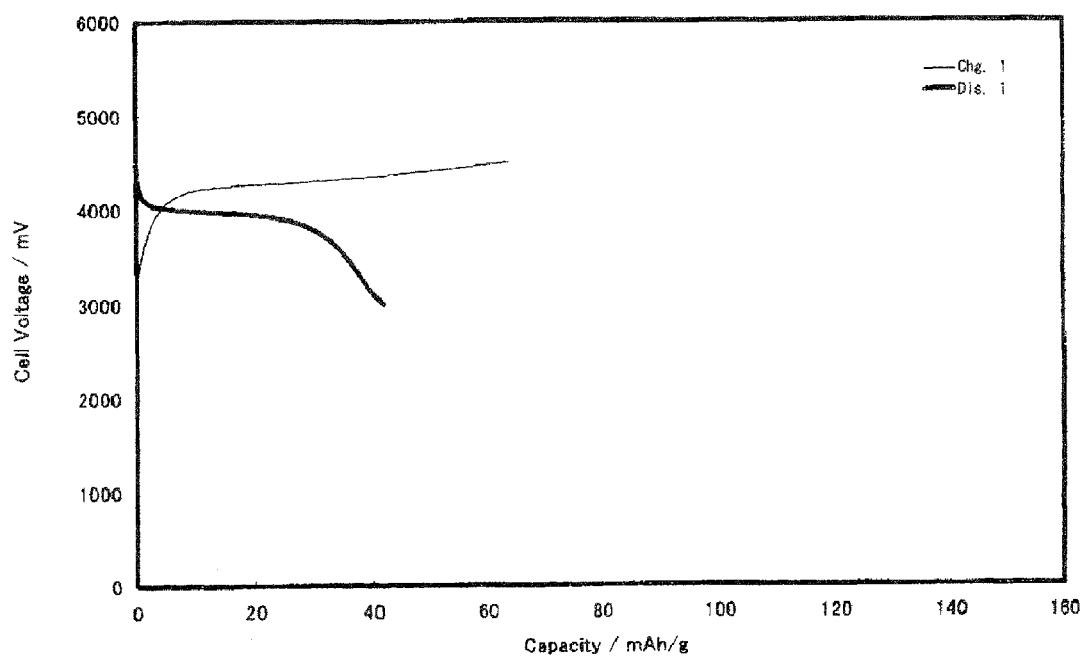
FIG. 21 is a graph that shows the results of a constant-current charge-discharge test on the basic lithium secondary battery fabricated in Example 10.

Constant-current charge-discharge testing was carried out as in Example 1. The initial charge-discharge characteristics are shown in Table 2 and FIG. 21.

Comparative Example 1

Figure 22:
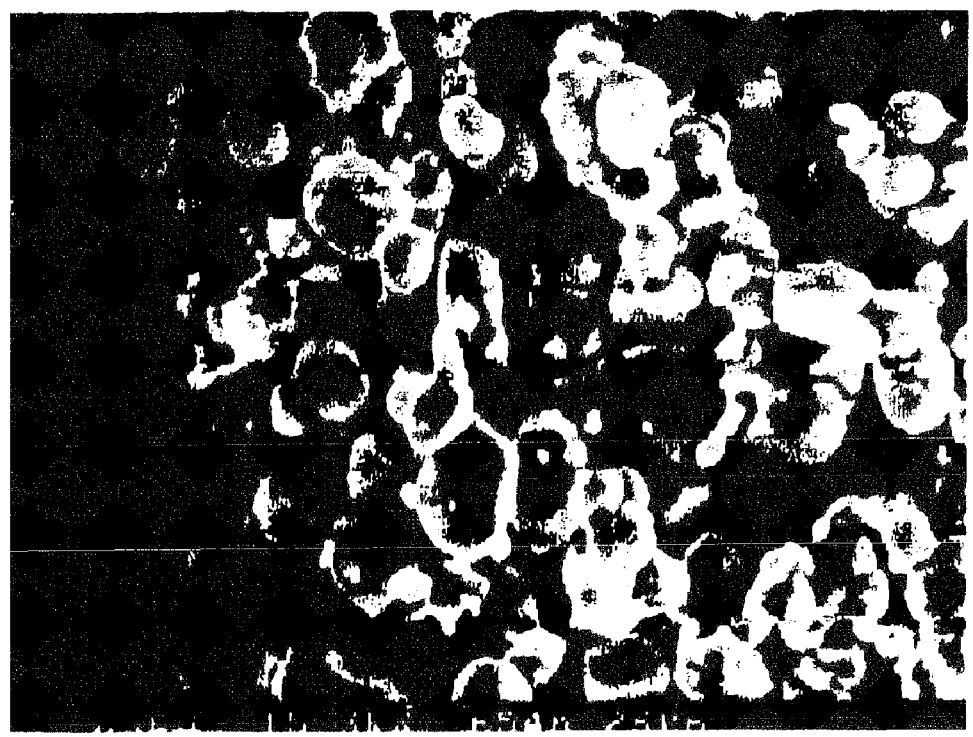
FIG. 22 is a scanning electron photomicrograph of the positive electrode active material produced in Comparative Example 1.

0.270 L of a 1.0 mol/L aqueous solution of Mn(CH$_3$COO)$_2$ was charged to a one-liter reactor, and 0.132 L of a 2.04 mol/L aqueous solution of H$_3$PO$_4$ was then added dropwise at 40° C. and over 30 minutes and mixing was carried out for an additional 30 minutes. 0.405 L of a 2.0 mol/L aqueous LiOH solution was thereafter added dropwise over 30 minutes, followed by heating to 100° C. and stirring for 1 hour. The resulting coprecipitated product was filtered off, washed with 1 L deionized water, and dried for 12 hours in a 140° C. oven. The resulting mixture was ground with a mortar. 10 g of this sample was then pre-calcined for 24 hours at 350° C. under an N$_2$ blanket and was thereafter subjected to main calcination for 24 hours at 700° C. under an N$_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 22.

Figure 23:
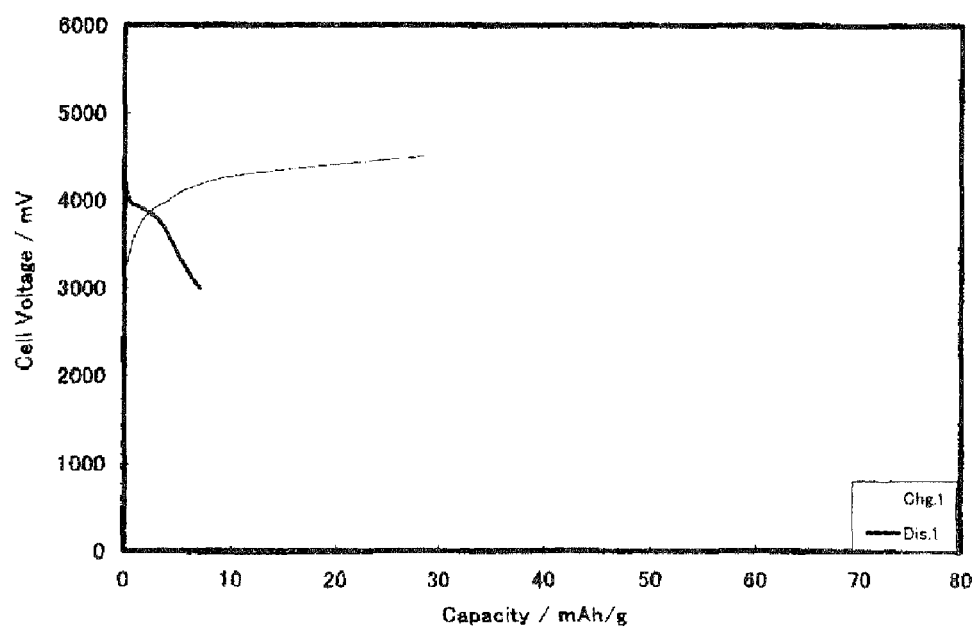
FIG. 23 is a graph that shows the results of a constant-current charge-discharge test on the basic lithium secondary battery fabricated in Comparative Example 1.

Constant-current charge-discharge testing was carried out as in Example 1. The initial charge-discharge characteristics are shown in Table 2 and FIG. 23.

Comparative Example 2

The procedure of Comparative Example 1 was followed, but in this case changing the main calcination temperature to 600° C. from 700° C. The resulting sample was analyzed as in Example 1. The results from the compositional analysis and x-ray diffraction measurement, the measured specific surface area, and the average particle diameter are shown in Table 1. According to the results from the x-ray diffraction measurement, an olivine-type single phase pattern was not obtained at the calcination temperature of 600° C. and unreacted Li$_3$PO$_4$ was observed.

Comparative Example 3

Figure 24:
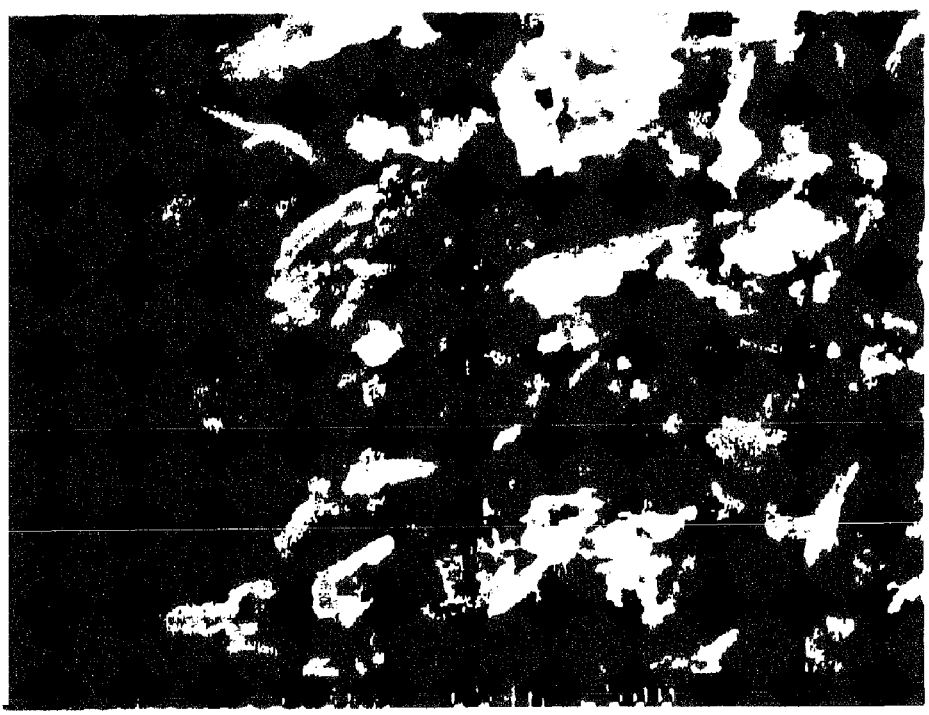
FIG. 24 is a scanning electron photomicrograph of the positive electrode active material produced in Comparative Example 3.

0.270 L of a 1.0 mol/L aqueous solution of Mn(CH$_3$COO)$_2$ was charged to a one-liter reactor, and 0.132 L of a 2.04 mol/L aqueous solution of H$_3$PO$_4$ was then added dropwise at 40° C. and over 30 minutes and mixing was carried out for an additional 30 minutes. 0.405 L of a 2.0 mol/L aqueous LiOH solution was thereafter added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g PVA and 50 mL deionized water with thorough mixing. This sample was dried for 12 hours in a 140° C. oven. The resulting mixture was ground with a mortar. It was then pre-calcined for 24 hours at 350° C. under an N$_2$ blanket and was thereafter subjected to main calcination for 24 hours at 700° C. under an N$_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 24.

Figure 25:
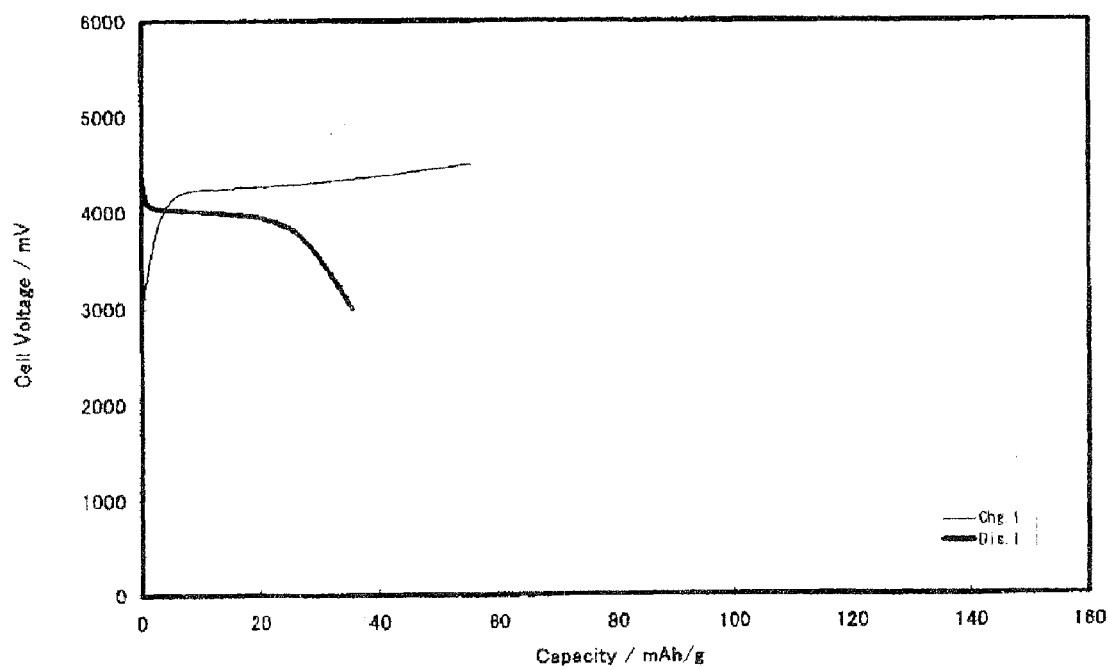
FIG. 25 is a graph that shows the results of a constant-current charge-discharge test on the basic lithium secondary battery fabricated in Comparative Example 3.
Figure 33:
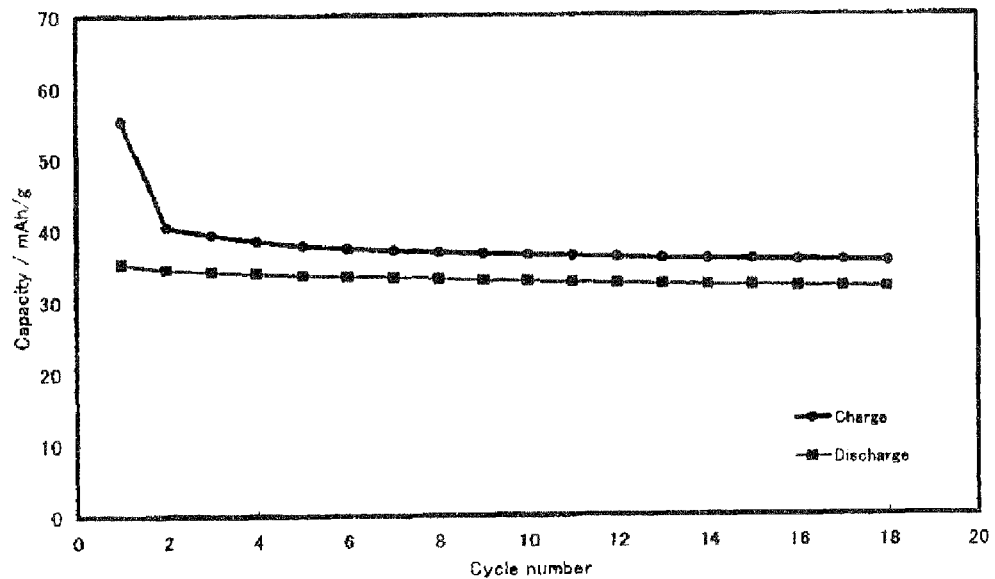
FIG. 33 is a graph that shows the results of a constant-current charge-discharge cycle test on the basic lithium secondary battery fabricated in Comparative Example 3.

Constant-current charge-discharge testing was carried out as in Example 1. The initial charge-discharge characteristics are shown in Table 2 and FIG. 25, while the cycle characteristics are shown in FIG. 33.

Comparative Example 4

Figure 26:
FIG. 26 is a scanning electron photomicrograph of the positive electrode active material produced in Comparative Example 4.

0.270 L of a 1.0 mol/L aqueous solution of Mn(CH$_3$COO)$_2$ was charged to a one-liter reactor, and to this was added 0.030 L of a 1.0 mol/L aqueous solution of Ti(SO$_4$)$_2$ with thorough stirring. 0.147 L of a 2.04 mol/L aqueous solution of H$_3$PO$_4$ was then added dropwise at 40° C. and over 30 minutes and mixing was carried out for an additional 30 minutes. 0.360 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g starch and 50 mL deionized water with thorough mixing. This sample was dried for 12 hours in a 140° C. oven. The resulting mixture was ground with a mortar. It was then pre-calcined for 24 hours at 350° C. under an N$_2$ blanket and was thereafter subjected to main calcination for 24 hours at 700° C. under an N$_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 26.

Figure 27:
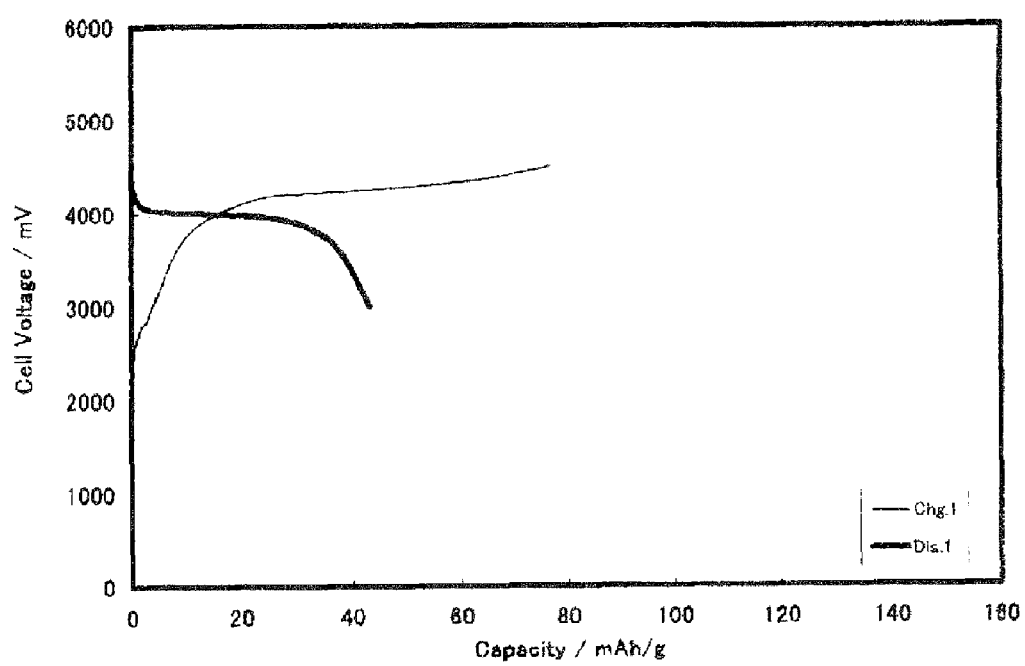
FIG. 27 is a graph that shows the results of a constant-current charge-discharge test on the basic lithium secondary battery fabricated in Comparative Example 4.

Constant-current charge-discharge testing was carried out as in Example 1. The initial charge-discharge characteristics are shown in Table 2 and FIG. 27.

Comparative Example 5

Figure 28:
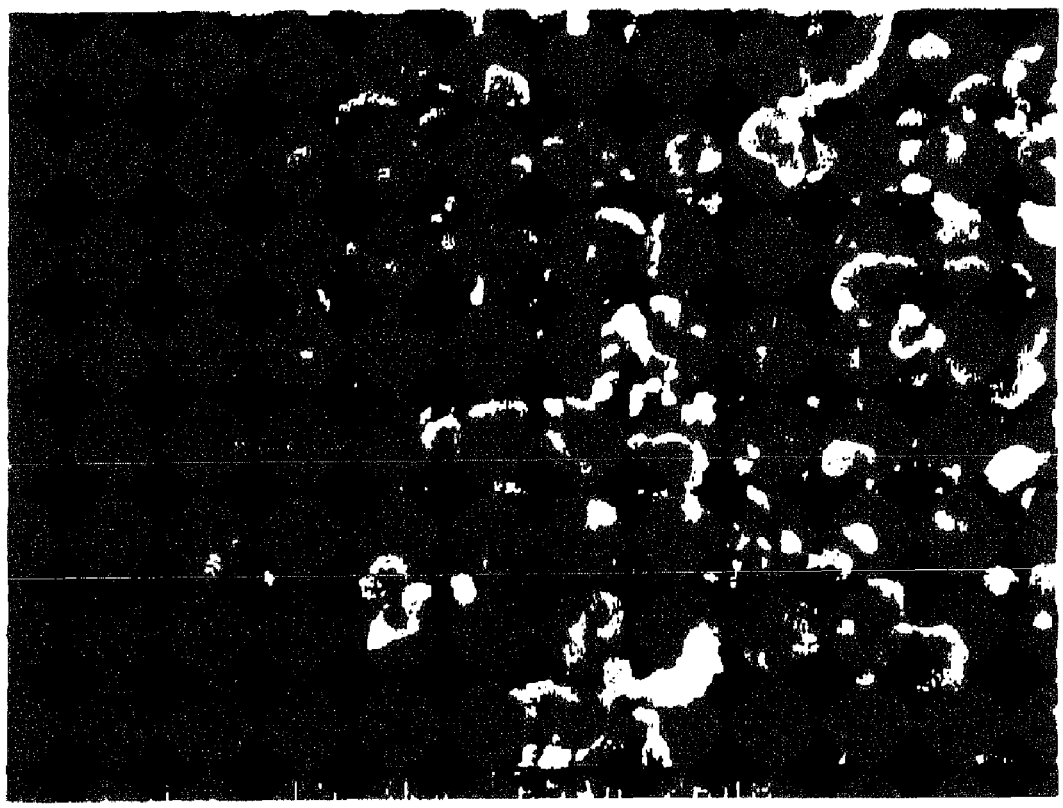
FIG. 28 is a scanning electron photomicrograph of the positive electrode active material produced in Comparative Example 5.
Figure 30:
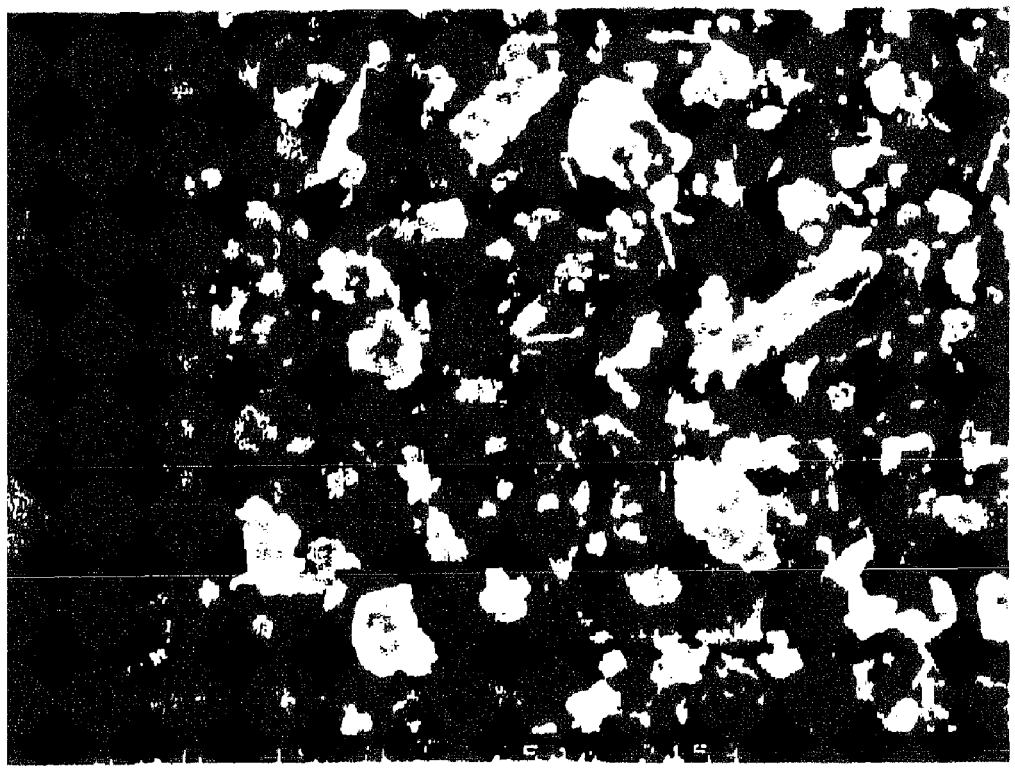
FIG. 30 is a scanning electron photomicrograph of the positive electrode active material produced in Comparative Example 6.

0.270 L of a 1.0 mol/L aqueous solution of Mn(CH$_3$COO)$_2$ was charged to a one-liter reactor, and to this was added 0.030 L of a 1.0 mol/L aqueous solution of CoSO$_4$ with thorough stirring. 0.147 L of a 2.04 mol/L aqueous solution of H$_3$PO$_4$ was then added dropwise at 40° C. and over 30 minutes and mixing was carried out for an additional 30 minutes. 0.360 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g starch and 50 mL deionized water with thorough mixing. This sample was dried for 12 hours in a 140° C. oven. The resulting mixture was ground with a mortar. It was then pre-calcined for 24 hours at 350° C. under an N$_2$ blanket and was thereafter subjected to main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 1; the SEM photograph is shown in FIG. 28.

analysis and x-ray diffraction measurement, the measured specific surface area, and the average particle diameter are shown in Table 1; the SEM photograph is shown in FIG. 30.

Figure 31:
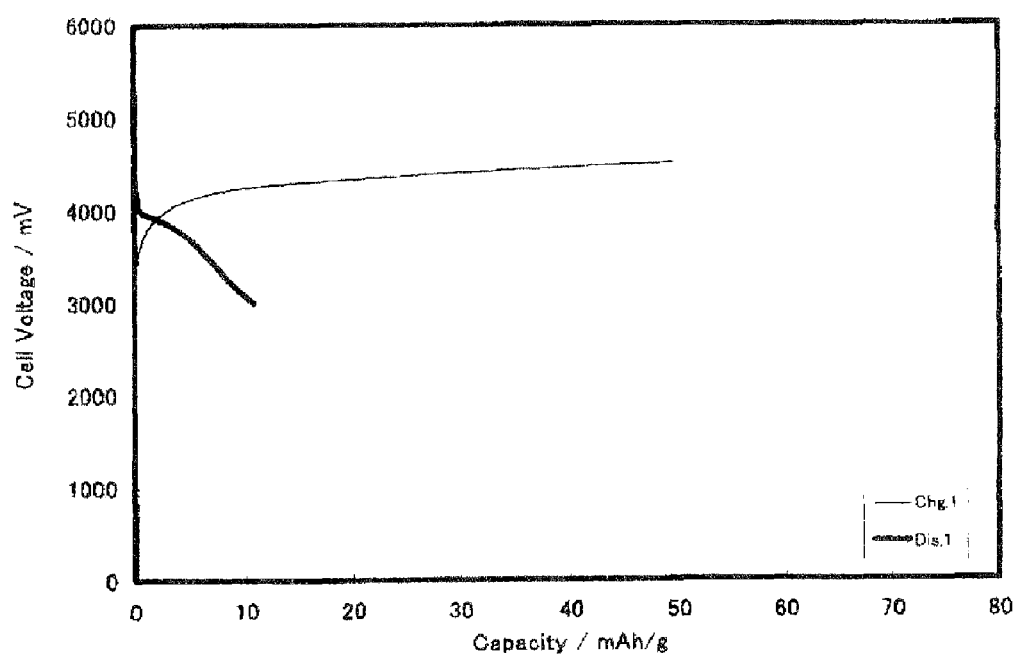
FIG. 31 is a graph that shows the results of a constant-current charge-discharge test on the basic lithium secondary battery fabricated in Comparative Example 6.

Constant-current charge-discharge testing was carried out as in Example 1. The initial charge-discharge characteristics are shown in Table 2 and FIG. 31.

TABLE 1

Composition and properties of the products

| | | substituting metal | carbon-containing material | fluorescent x-ray analysis (mol % versus Mn) | | | | calcination conditions ° C./hr | carbon content % | XRD | particle diameter nm | specific surface area m²/g |
|---|---|---|---|---|---|---|---|---|---|---|---|---|
| | | | | Mn | P | Li | % | | | | | |
| examples | 1 | Co 5M %, Ti 5M % | none | 1.00 | 0.98 | 0.98 | Co: 0.06 Ti: 0.04 | 700/24 | 0.02 | single phase | 183 | 9.8 |
| | 2 | Co 5M %, Ti 5M % | PVA | 1.00 | 1.02 | 1.01 | Co: 0.06 Ti: 0.04 | 700/24 | 6.13 | single phase | 102 | 27.0 |
| | 3 | Co 10M %, Ti 10M % | PVA | 1.00 | 1.09 | 1.07 | Co: 0.12 Ti: 0.12 | 700/24 | 4.13 | single phase | 113 | 28.8 |
| | 4 | Co 20M %, Ti 20M % | PVA | 1.00 | 1.14 | 1.10 | Co: 0.28 Ti: 0.21 | 700/24 | 4.16 | single phase | 91 | 30.1 |
| | 5 | Ni 10M %, Ti 10M % | PVA | 1.00 | 1.05 | 1.03 | Ni: 0.12 Ti: 0.11 | 700/24 | 12.04 | single phase | 94 | 26.4 |
| | 6 | Fe 10M %, Ti 10M % | PVA | 1.00 | 1.04 | 1.04 | Fe: 0.12 Ti: 0.12 | 700/24 | 3.46 | single phase | 78 | 27.5 |
| | 7 | Co 10M %, Ti 10M % | starch | 1.00 | 1.02 | 1.02 | Co: 0.12 Ti: 0.11 | 700/24 | 3.18 | single phase | 120 | 47.8 |
| | 8 | Co 10M %, Ti 10M % | granulated sugar | 1.00 | 1.02 | 1.02 | Co: 0.13 Ti: 0.11 | 700/24 | 3.35 | singe phase | 111 | 48.9 |
| | 9 | Co 5M %, Ni 5M % | PVA | 1.00 | 0.92 | 0.97 | Co: 0.05 Ni: 0.04 | 700/24 | 3.20 | single phase | 108 | 27.4 |
| | 10 | Co 5M %, Fe 5M % | PVA | 1.00 | 0.91 | 0.90 | Co: 0.05 Fe: 0.04 | 700/24 | 12.91 | single phase | 115 | 30.1 |
| comp. examples | 1 | none | none | 1.00 | 0.93 | 0.94 | — — | 700/24 | 0.02 | single phase | 785 | 1.8 |
| | 2 | none | none | 1.00 | 0.93 | 0.92 | — — | 600/24 | 0.02 | $Li_3PO_4$ + $LiMnPO_4$ | 202 | 10.6 |
| | 3 | none | PVA | 1.00 | 0.93 | 0.93 | — — | 700/24 | 3.96 | single phase | 223 | 33.1 |
| | 4 | Ti 10M % | starch | 1.00 | 0.86 | 0.90 | Ti: 0.10 — | 700/24 | 3.46 | single phase | 171 | 52.1 |
| | 5 | Co 10M % | starch | 1.00 | 1.05 | 1.03 | Co: 0.14 — | 700/24 | 3.56 | single phase | 241 | 47.1 |
| | 6 | Fe 10M % | starch | 1.00 | 0.95 | 0.96 | Fe: 0.14 — | 700/24 | 3.28 | single phase | 321 | 48.2 |

M % in the tables indicates mol %.

Figure 29:
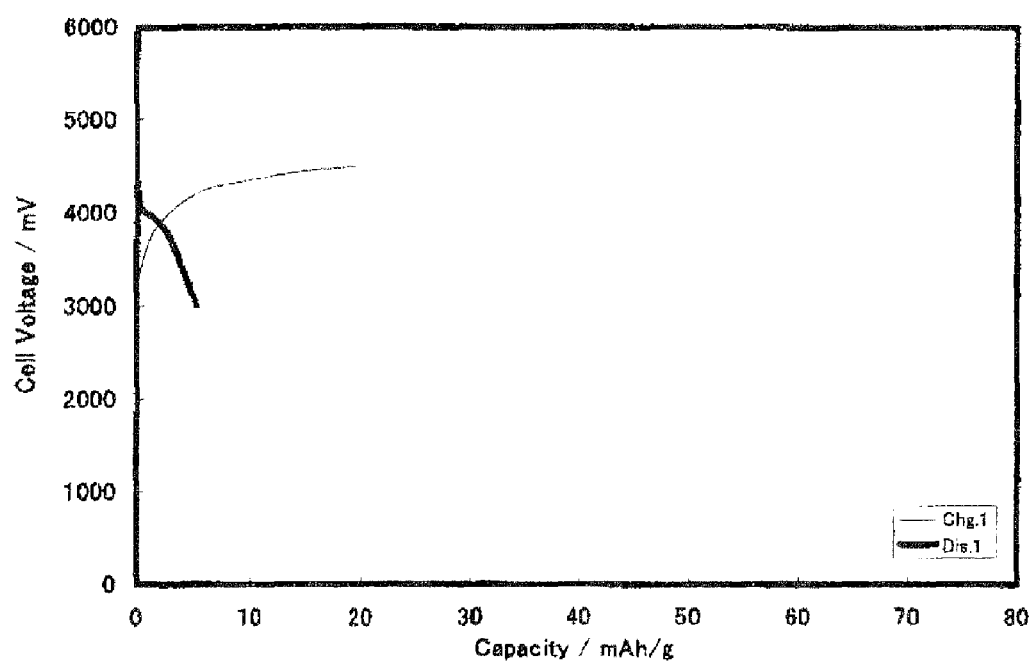
FIG. 29 is a graph that shows the results of a constant-current charge-discharge test on the basic lithium secondary battery fabricated in Comparative Example 5.

Constant-current charge-discharge testing was carried out as in Example 1. The initial charge-discharge characteristics are shown in Table 2 and FIG. 29.

Comparative Example 6

0.270 L of a 1.0 mol/L aqueous solution of $Mn(CH_3COO)_2$ was charged to a one-liter reactor, and to this was added 0.030 L of a 1.0 mol/L aqueous solution of $FeCl_3$ with thorough stirring. 0.147 L of a 2.04 mol/L aqueous solution of $H_3PO_4$ was then added dropwise at 40° C. and over 30 minutes and mixing was carried out for an additional 30 minutes. 0.360 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 10 g of the resulting sample were added 2.05 g starch and 50 mL deionized water with thorough mixing. This sample was dried for 12 hours in a 140° C. oven. The resulting mixture was ground with a mortar. It was then pre-calcined for 24 hours at 350° C. under an $N_2$ blanket and was thereafter subjected to main calcination for 24 hours at 700° C. under an $N_2$ blanket. The resulting sample was analyzed as in Example 1. The results from the compositional

TABLE 2

| | | substituting metal | carbon-containing material | discharge capacity mAh/g |
|---|---|---|---|---|
| examples | 1 | Co 5M %, Ti 5M % | none | 46 |
| | 2 | Co 5M %, Ti 5M % | PVA | 66 |
| | 3 | Co 10M %, Ti 10M % | PVA | 90 |
| | 4 | Co 20M %, Ti 20M % | PVA | 50 |
| | 5 | Ni 10M %, Ti 10M % | PVA | 72 |
| | 6 | Fe 10M %, Ti 10M % | PVA | 99 |
| | 7 | Co 10M %, Ti 10M % | starch | 79 |
| | 8 | Co 10M %, Ti 10M % | granulated sugar | 85 |
| | 9 | Co 5M %, Ni 5M % | PVA | 16 |
| | 10 | Co 5M %, Fe 5M % | PVA | 42 |
| comparative examples | 1 | none | none | 7 |
| | 2 | none | none | not measured |
| | 3 | none | PVA | 35 |
| | 4 | Ti 10M % | starch | 43 |
| | 5 | Co 10M % | starch | 5 |
| | 6 | Fe 10M % | starch | 11 |

Example 11

Figure 36:
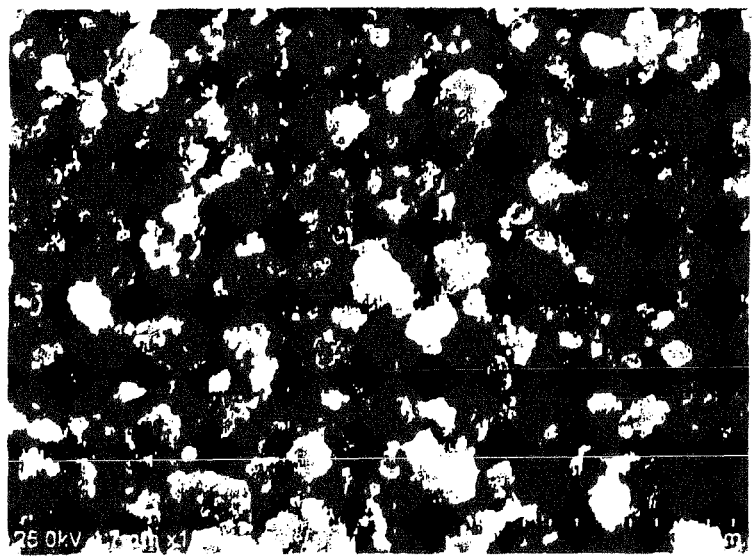
FIG. 36 is a scanning electron photomicrograph of the positive electrode active material produced in Example 11.

0.270 L of a 1.0 mol/L aqueous solution of $Mn(CH_3COO)_2$ was charged to a one-liter reactor, and to this were added 0.015 L of a 1.0 mol/L aqueous solution of $Fe_2(SO_4)_2$ and 0.031 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 15 g of the resulting sample were added 3.07 g glucose and 30 mL deionized water with thorough mixing using a planetary ball mill. This sample was dried for 12 hours in a 140° C. oven. The resulting mixture was ground with a mortar. It was then subjected to pre-calcination for 12 hours at 350° C. and main calcination for 24 hours at 650° C. under an $N_2$ blanket. The resulting sample was analyzed as in Example 1. The results from the compositional analysis and x-ray diffraction measurement, the measured specific surface area, and the average particle diameter are shown in Table 3; the SEM photograph is shown in FIG. 36.

Figure 37:
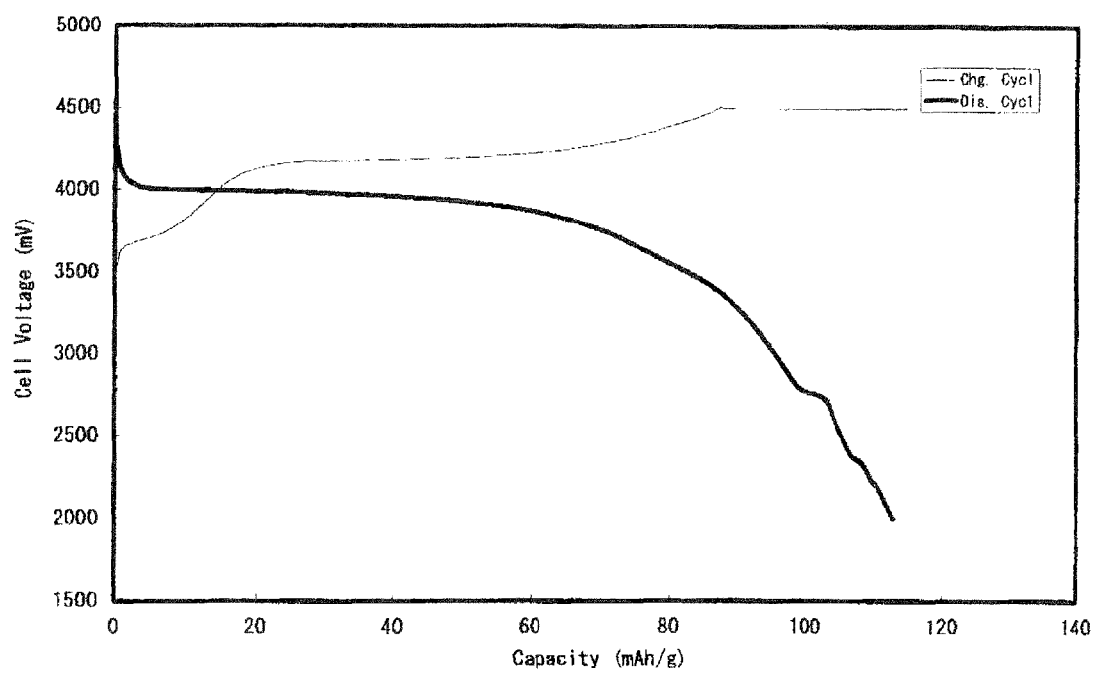
FIG. 37 is a graph that shows the results of a constant-current charge-discharge test on the basic lithium secondary battery fabricated in Example 11.

In constant-current charge-discharge testing in this example, charging was carried out at 25° C. by 1 C CC-CV. Discharge was carried out in the potential range of 2000 to 4500 mV at a rate of 1 C (approximately 0.9 mA/cm²). The potential (mV) and total capacity per unit gram of the positive electrode active material (mAh/g) recorded during the first charge-discharge cycle were designated as the initial charge-discharge characteristics. Otherwise, constant-current charge-discharge testing was carried out as in Example 1. The initial charge-discharge characteristics are shown in Table 4 and FIG. 37.

Example 12

Figure 38:
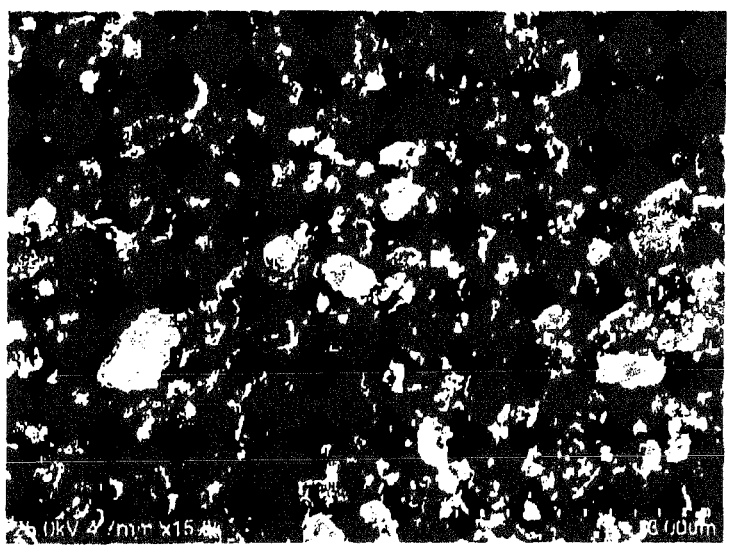
FIG. 38 is a scanning electron photomicrograph of the positive electrode active material produced in Example 12.

0.270 L of a 1.0 mol/L aqueous solution of $Mn(CH_3COO)_2$ was charged to a one-liter reactor, and to this were added 0.017 L of a 1.0 mol/L aqueous solution of $Fe_2(SO_4)_2$ and 0.034 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 15 g of the resulting sample were added 3.07 g glucose and 30 mL deionized water with thorough mixing using a planetary ball mill. This sample was dried for 12 hours in a 140° C. oven. The resulting mixture was ground with a mortar. It was then subjected to pre-calcination for 12 hours at 350° C. and main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 3; the SEM photograph is shown in FIG. 38.

Figure 39:
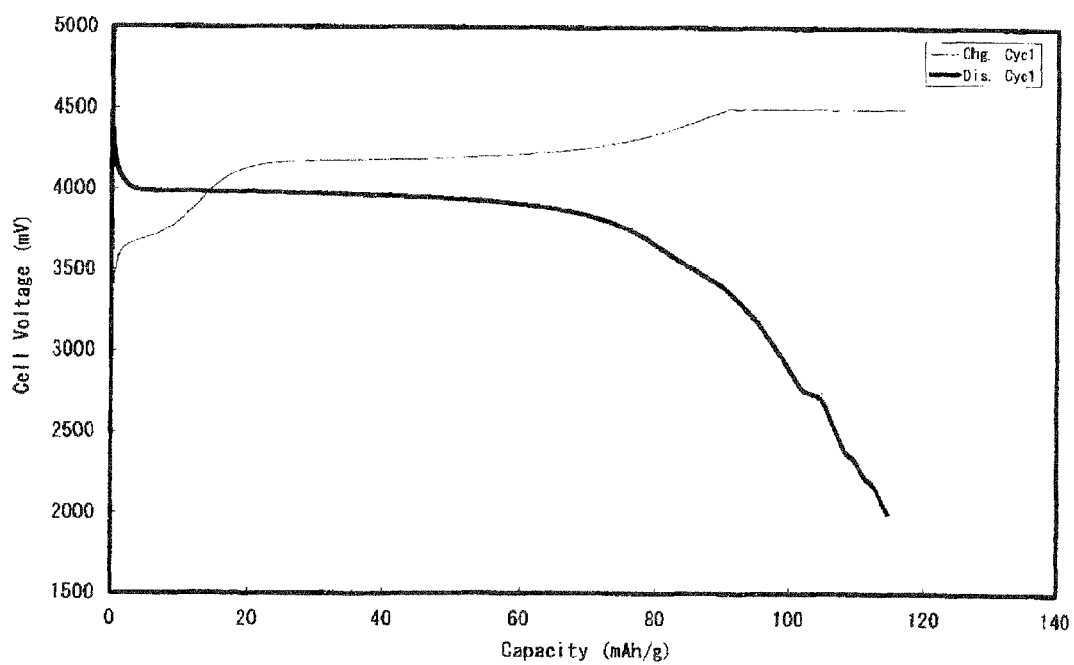
FIG. 39 is a graph that shows the results of a constant-current charge-discharge test on the basic lithium secondary battery fabricated in Example 12.

Constant-current charge-discharge testing was carried out as in Example 11. The initial charge-discharge characteristics are shown in Table 4 and FIG. 39.

Example 13

Figure 40:
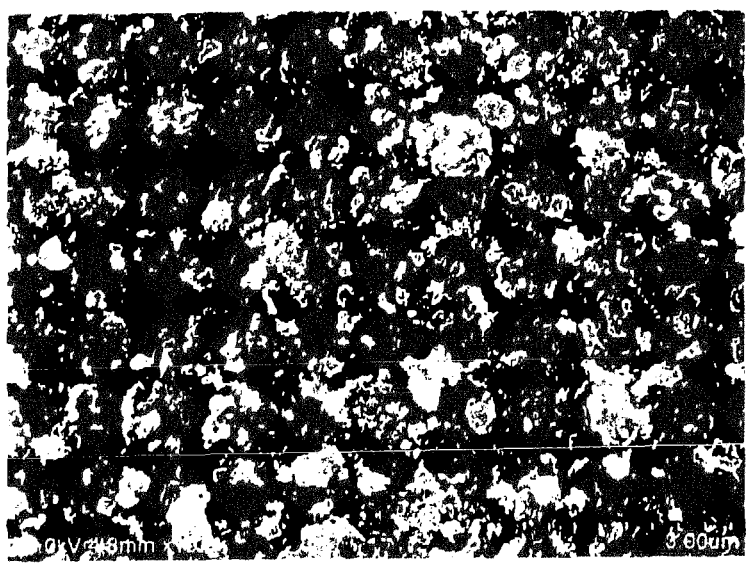
FIG. 40 is a scanning electron photomicrograph of the positive electrode active material produced in Example 13.

0.250 L of a 1.0 mol/L aqueous solution of $Mn(CH_3COO)_2$ was charged to a one-liter reactor, and to this were added 0.027 L of a 1.0 mol/L aqueous solution of $Fe_2(SO_4)_2$ and 0.060 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 15 g of the resulting sample were added 3.07 g glucose and 30 mL deionized water with thorough mixing using a planetary ball mill. This sample was dried for 12 hours in a 140° C. oven. The resulting mixture was ground with a mortar. It was then subjected to pre-calcination for 12 hours at 350° C. and main calcination for 24 hours at 700° C. under an $N_2$ blanket. The resulting sample was analyzed as in Example 1. The results from the compositional analysis and x-ray diffraction measurement, the measured specific surface area, and the average particle diameter are shown in Table 3; the SEM photograph is shown in FIG. 40.

Figure 41:
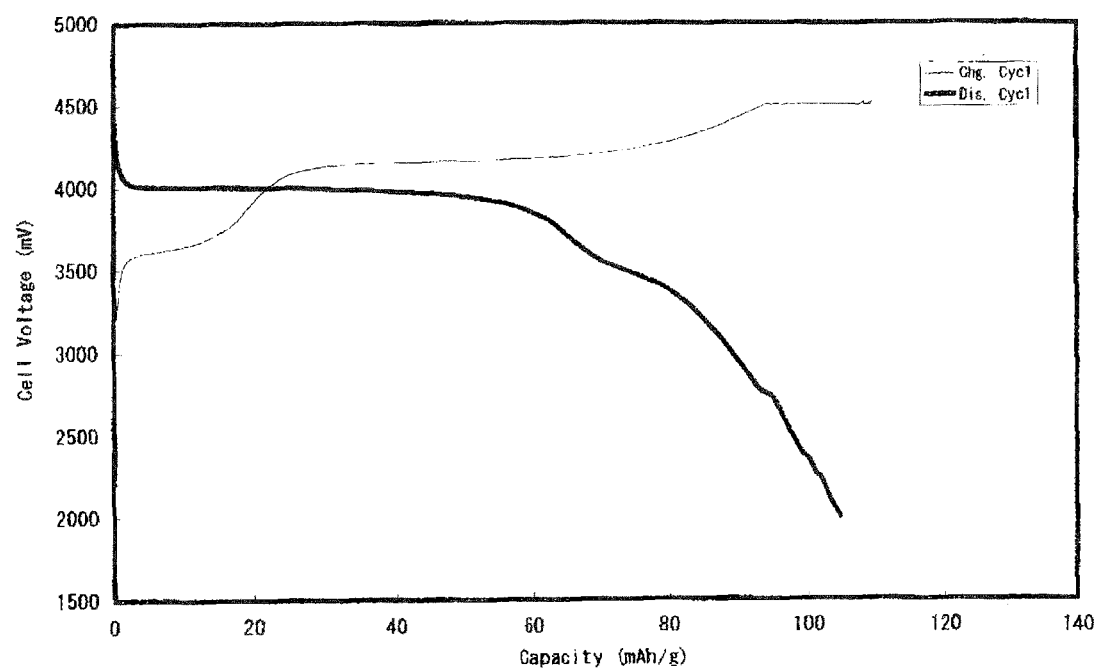
FIG. 41 is a graph that shows the results of a constant-current charge-discharge test on the basic lithium secondary battery fabricated in Example 13.

Constant-current charge-discharge testing was carried out as in Example 11. The initial charge-discharge characteristics are shown in Table 4 and FIG. 41.

Example 14

Figure 42:
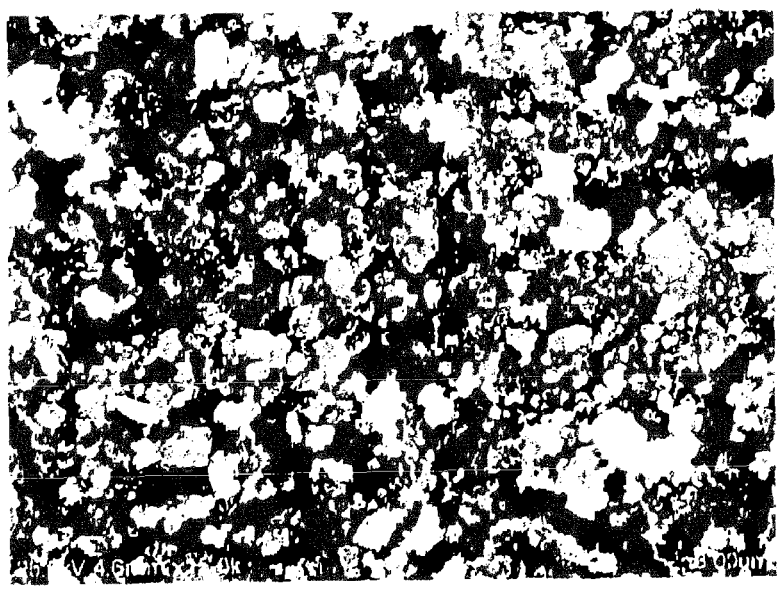
FIG. 42 is a scanning electron photomicrograph of the positive electrode active material produced in Example 14.

0.270 L of a 1.0 mol/L aqueous solution of $Mn(CH_3COO)_2$ was charged to a one-liter reactor, and to this were added 0.017 L of a 1.0 mol/L aqueous solution of $Fe_2(SO_4)_2$ and 0.034 L of a 1.0 mol/L aqueous solution of $Ti(SO_4)_2$ with thorough stirring. 0.166 L of a 2.04 mol/L aqueous solution of $H_3PO_4$ was then added dropwise at 40° C. and over 30 minutes and mixing was carried out for an additional 30 minutes. 0.406 L of a 2.5 mol/L aqueous LiOH solution was then added dropwise over 30 minutes, followed by heating to 100° C. and stirring for 1 hour. The resulting coprecipitated product was filtered off, washed with 1 L deionized water, and dried for 12 hours in a 140° C. oven. To 15 g of the resulting sample were added 1.56 g cellulose acetate and 25 mL acetone with thorough mixing using a planetary ball mill. This sample was dried for 12 hours in a 140° C. oven. The resulting mixture was ground with a mortar. It was then subjected to pre-calcination for 12 hours at 350° C. and main calcination for 24 hours at 650° C. under an $N_2$ blanket. The resulting sample was analyzed as in Example 1. The results from the compositional analysis and x-ray diffraction measurement, the measured specific surface area, and the average particle diameter are shown in Table 3; the SEM photograph is shown in FIG. 42.

Figure 43:
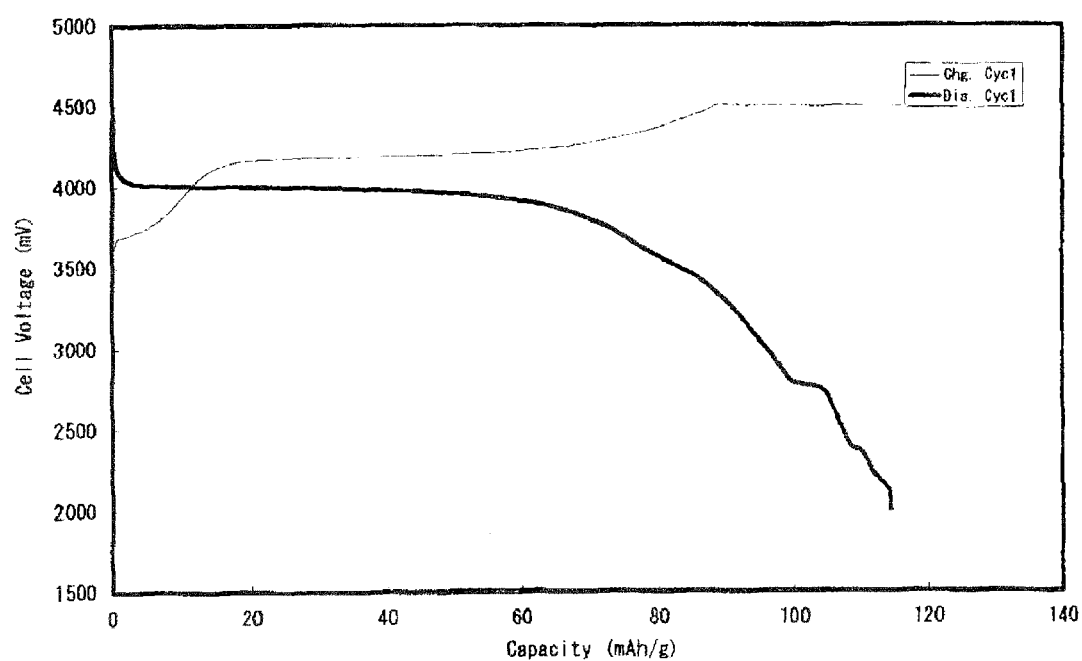
FIG. 43 is a graph that shows the results of a constant-current charge-discharge test on the basic lithium secondary battery fabricated in Example 14.

Constant-current charge-discharge testing was carried out as in Example 11. The initial charge-discharge characteristics are shown in Table 4 and FIG. 43.

Example 15

Figure 44:
FIG. 44 is a scanning electron photomicrograph of the positive electrode active material produced in Example 15.

The procedure of Example 14 was carried out, but in this case changing the added carbon precursor from cellulose acetate to pyromellitic acid and changing the acetone to ethanol. The resulting sample was analyzed as in Example 1. The results from the compositional analysis and x-ray diffraction measurement, the measured specific surface area, and the average particle diameter are shown in Table 3; the SEM photograph is shown in FIG. 44.

Figure 45:
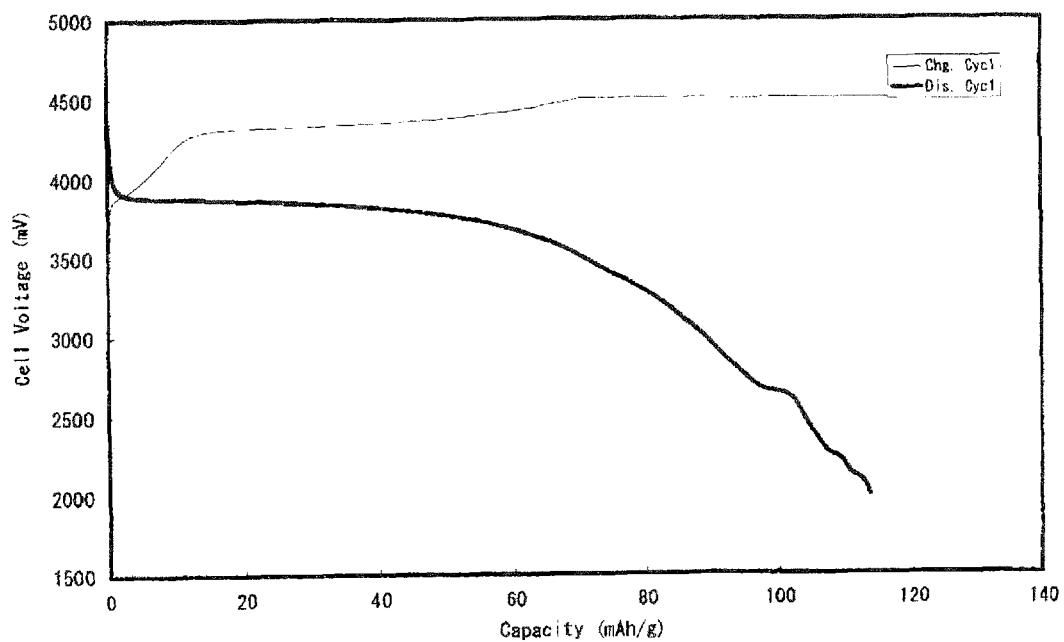
FIG. 45 is a graph that shows the results of a constant-current charge-discharge test on the basic lithium secondary battery fabricated in Example 15.

Constant-current charge-discharge testing was carried out as in Example 11. The initial charge-discharge characteristics are shown in Table 4 and FIG. 45.

TABLE 3

Composition and properties of the products

| examples | substituting metal | carbon-containing material | fluorescent x-ray analysis (mol % versus Mn) | | | | calcination conditions °C./hr | carbon content % | XRD | particle diameter nm | specific surface area m²/g |
|---|---|---|---|---|---|---|---|---|---|---|---|
| | | | Mn | P | Li | % | | | | | |
| 11 | Fe 9M %, Ti 9M % | glucose | 1.00 | 1.09 | 1.22 | Fe: 0.10 Ti: 0.10 | 650/24 | 5.01 | single phase | 93 | 29.6 |
| 12 | Fe 10M %, Ti 10M % | glucose | 1.00 | 1.04 | 1.33 | Fe: 0.12 Ti: 0.13 | 700/24 | 4.90 | single phase | 82 | 35.9 |
| 13 | Fe 15M %, Ti 15M % | glucose | 1.00 | 1.22 | 1.45 | Fe: 0.21 Ti: 0.22 | 700/24 | 5.77 | single phase | 80 | 39.6 |
| 14 | Fe 10M %, Ti 10M % | cellulose acetate | 1.00 | 1.09 | 1.28 | Fe: 0.13 Ti: 0.13 | 650/24 | 2.09 | single phase | 98 | 18.0 |
| 15 | Fe 10M %, Ti 10M % | pyro-mellitic acid | 1.00 | 1.09 | 1.28 | Fe: 0.13 Ti: 0.13 | 650/24 | 3.09 | single phase | 104 | 16.1 |

TABLE 4

| examples | substituting metal | carbon-containing material | discharge capacity mAh/g |
|---|---|---|---|
| 11 | Fe 9M %, Ti 9M % | glucose | 113 |
| 12 | Fe 10M %, Ti 10M % | glucose | 115 |
| 13 | Fe 15M %, Ti 15M % | glucose | 105 |
| 14 | Fe 10M %, Ti 10M % | cellulose acetate | 114 |
| 15 | Fe 10M %, Ti 10M % | pyromellitic acid | 114 |

INDUSTRIAL APPLICABILITY

Examples of nonaqueous electrolyte batteries that utilize the positive electrode active material of the present invention are lithium secondary batteries such as lithium metal batteries, lithium ion batteries, lithium polymer batteries, and so forth.

The invention claimed is:

1. A positive electrode active material that comprises an olivine-type lithium manganese phosphate compound represented by the following general formula (2)

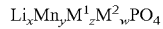

$$Li_xMn_yM^1{}_zM^2{}_wPO_4 \qquad (2)$$

(in the formula, $0<x<2$, $0<y<1$, $0<z<0.2$, $0<w<0.2$, $M^1$ is at least one divalent metal element selected from the group consisting of Co, Ni, Fe, Zn, and Cu, and $M^2$ is at least one trivalent or tetravalent metal element selected from the group consisting of Ti, Sn, Zr, V, and Al) and that has a particle diameter of 10 to 120 nm.

2. The positive electrode active material according to claim 1, wherein $M^1$ is at least one divalent metal element selected from the group consisting of Co, Ni, and Fe, and $M^2$ is Ti.

3. The positive electrode active material according to claim 1, wherein y satisfies $0.8<y<1.0$.

4. The positive electrode active material according to claim 1, wherein the particle diameter is 50 to 120 nm.

5. The positive electrode active material according to claim 1, that has a BET specific surface area of 1 to 200 m²/g.

6. The positive electrode active material according to claim 1, further comprising carbon on the surface of the olivine-type lithium manganese phosphate compound particles.

7. The positive electrode active material according to claim 6, that contains carbon in an amount no greater than 20 weight %.

8. A nonaqueous electrolyte battery, which has a positive electrode comprising the positive electrode active material according to claim 1.

* * * * *